(12) United States Patent
Kapadia et al.

(10) Patent No.: US 7,113,852 B2
(45) Date of Patent: Sep. 26, 2006

(54) SYSTEM AND METHOD FOR TRANSPORTATION VEHICLE MONITORING, FEEDBACK AND CONTROL

(76) Inventors: Viraf S. Kapadia, c/o Star Navigation Systems, Inc., 1020 Matheson Boulevard East, Unit 12, Mississauga, Ontario (CA) L4W 4J9; Hilary Vieira, c/o Star Navigation Systems, Inc., 1020 Matheson Boulevard East, Unit 12, Mississauga, Ontario (CA) L4W 4J9

(*) Notice: Subject to any disclaimer, the term of this patent is extended or adjusted under 35 U.S.C. 154(b) by 0 days.

(21) Appl. No.: 10/333,330

(22) PCT Filed: Jul. 20, 2001

(86) PCT No.: PCT/IB01/01576

§ 371 (c)(1),
(2), (4) Date: Aug. 14, 2003

(87) PCT Pub. No.: WO02/08057
PCT Pub. Date: Jan. 31, 2002

(65) Prior Publication Data
US 2005/0065682 A1 Mar. 24, 2005

Related U.S. Application Data

(60) Provisional application No. 60/275,520, filed on Mar. 14, 2001, provisional application No. 60/219,736, filed on Jul. 20, 2000.

(51) Int. Cl.
*G06F 7/00* (2006.01)
(52) U.S. Cl. .......................... 701/33; 701/35
(58) Field of Classification Search ................ 701/117, 701/120, 35, 14, 213, 33; 342/357.09, 357.07, 342/357.15, 457; 340/989, 994, 992
See application file for complete search history.

(56) References Cited

U.S. PATENT DOCUMENTS

| | | | |
|---|---|---|---|
| 4,729,102 A | | 3/1988 | Miller, Jr. et al. |
| 4,804,937 A | * | 2/1989 | Barbiaux et al. ........... 340/459 |
| 5,185,700 A | * | 2/1993 | Bezos et al. .................. 701/35 |
| 5,442,553 A | * | 8/1995 | Parrillo ....................... 455/420 |
| 5,445,347 A | * | 8/1995 | Ng .......................... 246/169 R |
| 5,867,801 A | * | 2/1999 | Denny ......................... 701/35 |
| 5,890,079 A | | 3/1999 | Levine |
| 5,974,349 A | | 10/1999 | Levine |

(Continued)

FOREIGN PATENT DOCUMENTS

DE   196 08 516   9/1997

(Continued)

*Primary Examiner*—Michael J. Zanelli
(74) *Attorney, Agent, or Firm*—Pillsbury Winthrop Shaw Pittman LLP

(57) ABSTRACT

A system provides monitoring/feedback to a transportation vehicle regarding the state of that vehicle based on, at least, information provided by sensors located on or in the transportation vehicle. Monitoring the transportation vehicle provides information about the status of the transportation vehicle and equipment on or in the vehicle. Feedback information is provided to the transportation vehicle based on the information received during monitoring. Additionally, feedback information may be formulated based on additional criteria received from equipment other than the sensors located on or in the vehicle, for example, meteorological systems, geographic location systems, e.g., a radar system, a global positioning system, etc. The information provided by the sensors and the formulated feedback information may be stored in memory on the transportation vehicle as well as at a stable location for archiving and subsequent analysis.

76 Claims, 7 Drawing Sheets

U.S. PATENT DOCUMENTS

| | | | | |
|---|---|---|---|---|
| 5,990,928 | A * | 11/1999 | Sklar et al. | 725/72 |
| 6,097,343 | A * | 8/2000 | Goetz et al. | 343/708 |
| 6,167,239 | A * | 12/2000 | Wright et al. | 455/66.1 |
| 6,175,336 | B1 * | 1/2001 | Coughlin et al. | 343/708 |
| 6,181,990 | B1 * | 1/2001 | Grabowsky et al. | 701/14 |
| 6,249,913 | B1 * | 6/2001 | Galipeau et al. | 725/76 |
| 6,278,913 | B1 * | 8/2001 | Jiang | 701/3 |
| 6,330,499 | B1 * | 12/2001 | Chou et al. | 701/33 |
| 6,577,419 | B1 * | 6/2003 | Hall et al. | 398/115 |
| 6,647,356 | B1 * | 11/2003 | Pierro et al. | 702/184 |
| 6,898,492 | B1 * | 5/2005 | de Leon et al. | 701/35 |
| 2004/0093196 | A1 * | 5/2004 | Hawthorne et al. | 703/8 |

FOREIGN PATENT DOCUMENTS

| | | |
|---|---|---|
| EP | 0 407 179 | 1/1991 |
| WO | WO 90/09645 | 8/1990 |

* cited by examiner

SYSTEM AND METHOD FOR TRANSPORTATION VEHICLE MONITORING, FEEDBACK AND CONTROL

This is the National Phase of International Application No. PCT/IB01/01576, filed in English on Jul. 20, 2001, and claims the benefit of U.S. Provisional Applications No. 60/219,736, filed on Jul. 20, 2000, and 60/275,520, filed on Mar. 14, 2001, the entirety of which are hereby incorporated into the present application by reference.

BACKGROUND OF THE INVENTION

1. Field of the Invention

The present invention relates to methods and systems for transportation vehicle operation, performance and condition monitoring and feedback.

2. Description of Related Art

In the case of a transportation vehicle accident, e.g., an aircraft crash, a transportation vehicle data recorder (TVDR), e.g., a Flight Data Recorder (FDR, also known as a "black box"), is used to aid in determining the cause of the crash. However, the TVDR is not always easily located in the remains of the transportation vehicle wreckage. The TVDR also does not monitor existing transportation vehicle conditions during operation, for example, FDRs do not monitor existing transportation vehicle conditions during flight. Moreover, conventional TVDRs are not appropriate tools for gathering and analyzing research data that can eventually be used to improve transportation technology as a whole.

This is a significant deficiency as operators of transportation vehicles such as aircraft are under significant business pressure to reduce the risk of accidents and to ensure that the costs of operating these transportation vehicles are minimized. Various certified commercial tools are available for these purposes on large commercial transportation vehicles such as commercial aircraft whose operators typically maintain custom software and hardware, for example, data down link, i.e., transmission from a commercial aircraft to ground stations, capability presently employed on large airliners for communication with home base. Such data down link technology uses, for example, the Airborne Call and Recording System (ACARS). Conventionally, such software applications used for aircraft performance analysis are written by commercial transportation carriers, for example, specific commercial airline companies each design their own aircraft performance analysis tools.

Nevertheless, such performance analysis technology is prohibitively expensive to maintain for small commercial transportation carriers and non-commercial transportation vehicle operators with more limited manpower and operational resources.

Moreover, in the commercial and non-commercial aircraft industry, as well as any other transportation vehicle industry, there are few tools for real-time diagnosis of transportation vehicle condition to improve safety and access to assistance for transportation vehicle operators. Additionally, there are presently no methods or systems for easily monitoring characteristics of an individual transportation vehicle's condition, performance and operation. Moreover, there is presently no method or system for comparing the condition, performance or operation of particular types of transportation vehicles, a plurality of transportation vehicles, under various atmospheric conditions, on particular geographic or topological routes, etc., with each other or against empirical parameters.

SUMMARY OF THE INVENTION

Accordingly, various embodiments of the invention are directed at providing monitoring and feedback systems and methods that provide monitoring of transportation vehicle performance, operation and condition characteristics. An on-vehicle component of the system both stores and transmits information about the performance, operation and/or condition of the transportation vehicle to a base-station component of the system. The base-station component of these systems may store the information received from the on-vehicle component, performs analysis of the vehicle characteristics and both stores and transmits feedback information to the transportation vehicle based on that analysis. This feedback information may be received by a human operator or an automated or semi-automated system of an on-vehicle component of the systems to provide information about the performance, operation or condition of the vehicle and/or control performance or operation of the transportation vehicle.

Additionally, it is foreseeable that the monitoring information provided to the base-station component and feedback information provided to the on-vehicle component may be archived and used to profile operation, performance, or conditions of a particular transportation vehicle, a particular type of transportation vehicle or a plurality of transportation vehicles over a period of time, under specific environmental conditions or any other useful criteria. This archived information may also be used to perform investigation of the performance, operation or condition of a transportation vehicle in the case of an accident, e.g., a plane crash. In accordance with at least one embodiment of the invention, an expert system may be included in one or both of the on-vehicle component and the base-station component that analyzes and learns from the archived information and may suggest and/or actuate taking a particular action or set of actions or prohibit taking that action or set of actions to control operation of the transportation vehicle if, for example, it recognizes that one or more particular actions are advisable or inadvisable.

These and other features and advantages of this invention are described in or are apparent from the following detailed description of the systems and methods according to this invention.

BRIEF DESCRIPTION OF THE DRAWINGS

Further objects and advantages of this invention will be evident when the following detailed description is read in conjunction with the attached drawings, in which.

DETAILED DESCRIPTION OF INVENTION EMBODIMENTS

It should be appreciated that the term "transportation vehicle" may include any vehicle used for transportation of cargo and/or people. Therefore, transportation vehicles may include cars, trucks, boats, ships, planes, satellites, or any other now known or later developed vehicle for transportation that includes equipment that is susceptible to failure.

According to the embodiments, the transportation vehicle monitoring and feedback system is implemented in conjunction with a transportation vehicle. For ease of explanation, description of various embodiments of the invention will refer to a transportation vehicle that is an aircraft. However, it should be appreciated that the transportation vehicle may be any other potentially transportation vehicle including but not limited to aircraft, rockets, missiles, blimps, balloons, satellites, a land-based vehicle, including but not limited to automobiles such as cars, trucks, utility vehicles, buses, trains, tanks, remotely operated land vehicles, or a watercraft, i.e., a vehicle capable of providing transportation via a body of water, including but not limited to boats, ships, submarines, hovercrafts, etc.

At least one of the embodiments of the invention may be implemented in conjunction with transportation vehicle data recorders (TVDRs) in transportation vehicles, e.g., FDR in aircraft. For example, on an aircraft, on-board components of the monitoring and feedback system may be coupled to the secondary feed of the aircraft's "black box" or FDR.

Digital data transmission technology has advanced significantly in recent years and both technology and processing capabilities have now progressed to the point that reliable digital data transmission equipment can be economically installed on a transportation vehicle platform. Such on-vehicle equipment may be used in conjunction with existing transmission technology, for example, ACARS-VHF, the Internet, and also as an effective adjunct to the Global Positioning System (GPS) to communicate with a base-station component. Additionally, software has advanced to the point that operators can be provided with simple to develop, economic, commercial packages that are autonomous in operation, user friendly, flexible and reliable.

Figure 1:
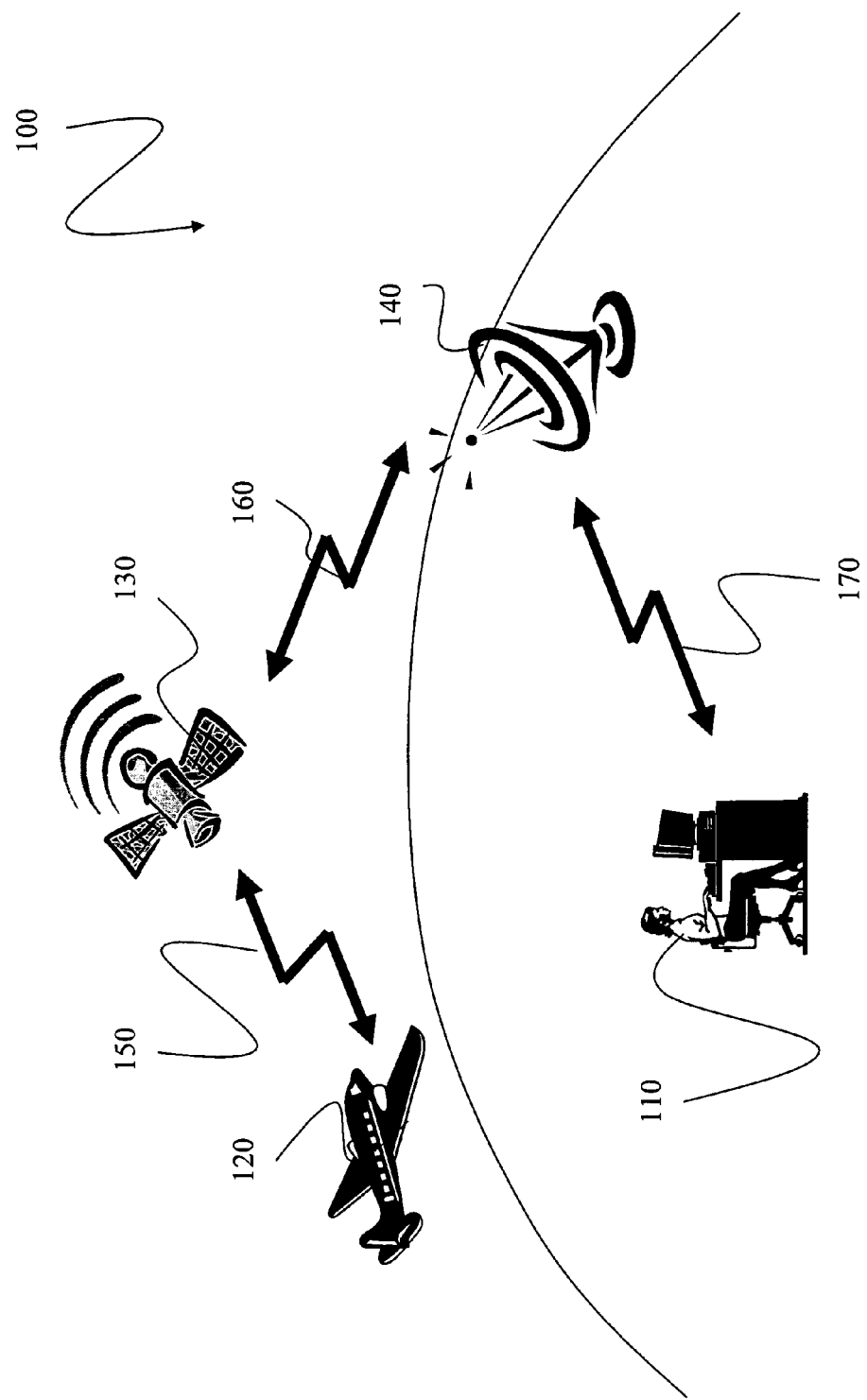
FIG. 1 illustrates one implementation of the embodiments of the invention used in conjunction with a transportation vehicle that is an aircraft and transmission capability provided by satellite.

FIG. 1 illustrates one implementation of a transportation vehicle monitoring and feedback system designed in accordance with the at least one embodiment of the invention and implemented in a transportation vehicle that is an aircraft. As shown in FIG. 1, a base-station 110 communicates with a transportation vehicle 120, in this instance an aircraft, via at least one satellite 130 and an antenna 140. The transportation vehicle 120 communicates with the satellite 130 via a transmission link 150 that may be, for example, a radio-frequency communication link, conventionally understood in the satellite communication industry. The satellite 130 communicates with the antenna 140, which may be, for example, a land-based transceiver, via a communication link 160, which may be, for example, a radio-frequency communication link. The antenna 140 communicates with the base-station 110 via a communication link 170, which may be, for example, a radio-frequency communication link, a cable, a wireless link, a communication path on the Internet, an Intranet and/or any public or private network.

Data transmission from the transportation vehicle 120 to the base-station 110 may be performed using any of various alternative transmission formats and technologies to provide the constituent transmission links 150–170. For instance, when implemented with transportation vehicles 120 that are aircraft or other airborne vehicles, ACARS may be used to provide that data transmission links necessary to provide communication between the transportation vehicle 120 and the base-station 110.

ACARS is a certified, widely used aeronautical communication device, and as such presents one low risk method for establishing air to ground data communications that may be used, for example, when the transportation vehicle is an aircraft or other airborne transportation vehicle. Although conventional use of airborne broadband applications is still experimental, there is good reason to believe that such communication methodologies will soon be certified by regulatory organizations. The use of Low Earth Orbit (LEO) satellite telephony is also possible through the use of certified aircraft applications, e.g., Collins® Satcom facility. It is also foreseeable that Wireless Application Protocol (WAP) may be utilized to provide communication links between base-stations and transportation vehicles, as an extension of broadband application with enhanced portal facilities.

ACARS is available for almost all flight paths on the globe and is transmitted in the following frequencies:

131.550 MHz—ACARS Primary channel for North America 131.475 MHz—Company channel for Air Canada®

(and some European airlines in North America)

Figure 7:
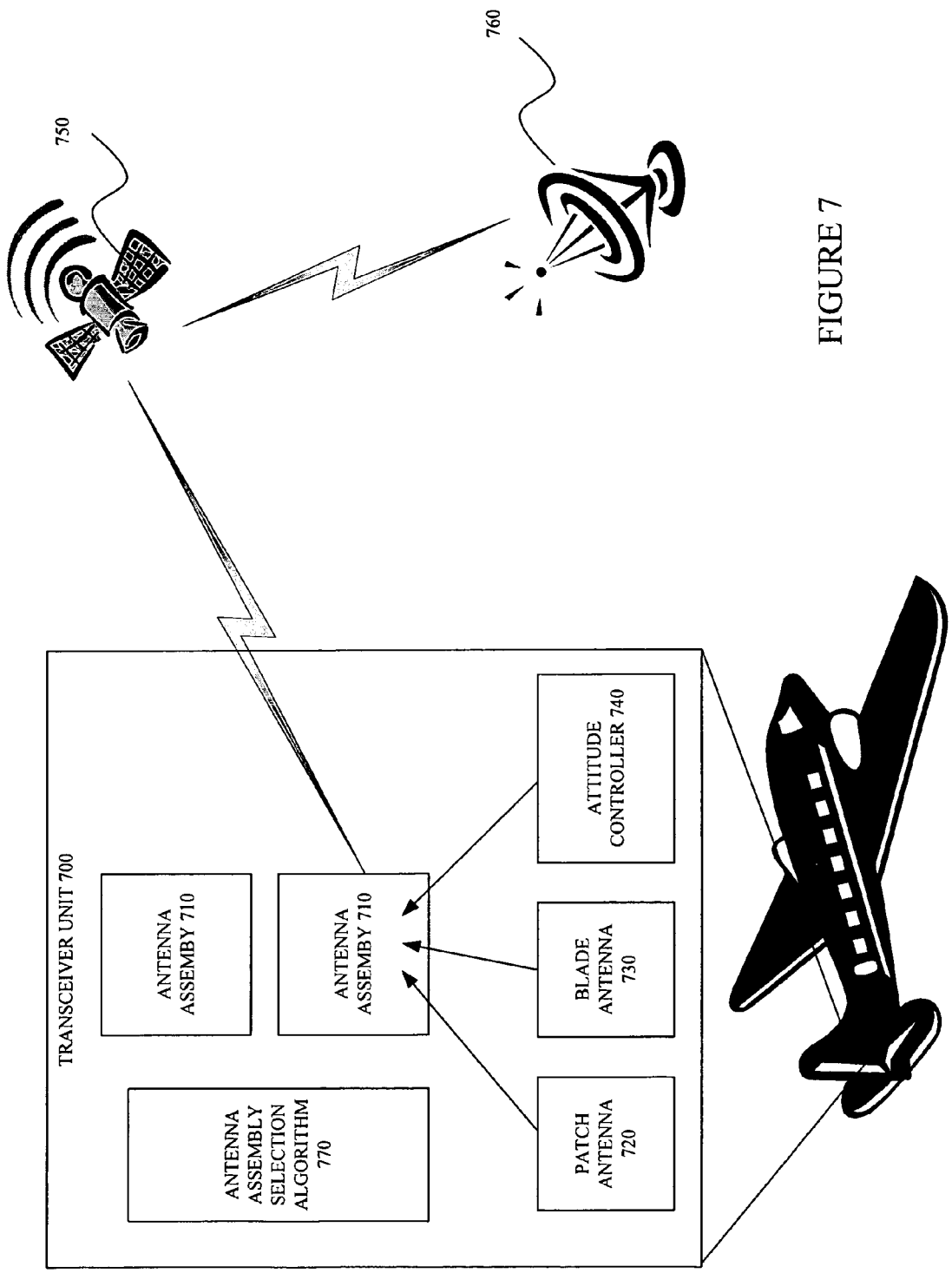
FIG. 7 illustrates additional details of one implementation of the on-vehicle component provided on a transportation vehicle in accordance with the embodiments of the invention.

130.025 MHz—ACARS Secondary channel for North America 129.125 MHz—ACARS Tertiary channel for North America 136.900 MHz—ACARS channel situated near London 131.725 MHz—ACARS channel Primary channel for Europe 131.525 MHz—ACARS channel Tertiary channel for Europe 131.550 MHz—ACARS Primary channel for Asia/Pacific 131.450 MHz—ACARS Primary channel for Japan It should be understood that, particular with the implementation of invention embodiments with aircrafts, an antenna assembly (see, for example, antenna assembly 710 included in the transceiver unit 700 llustrated in FIG. 7), e.g., one including a blade antenna, see, for example, blade antenna 730, may track satellites 750 dynamically to provide communication with the base station(s) 760 to ensure that one or more communication links is maintained to provide continuous or periodic communication with the base station. Such an ability to track a satellite may be provided, in part, using an attitude controlle 740r.

Alternatively, the antenna assembly may use one or more patch antennas, e.g., patch antenna 730, which may be manufactured using mold technology, to provide communication with the base station(s). Additionally, such a patch antenna may suffer from issues related to cloud cover and transmission and reception noise. This and other noise suffered by the communication system may be reduced by using a filter, for example, a filter designed by Dynocon located in Toronto, Canada.

One or more antennas or antenna assemblies 710 may be placed on the tail section of an aircraft to help ensure that there at least one antenna or antenna assemble that has a sufficient spatial relationship with the location of one or more satellites. In such a configuration, or any other configuration in which more than one antenna or antenna assembly is available, an algorithm (such as, for example, an antenna assembly selection algorithm 770) may be utilized to dynamically switch between the feeds of the plurality of antennas or antennas assemblies to provide the best possible communication connection between the transportation vehicle and the base station(s). In such an implementation, the algorithm could allow for switching between feeds if, for example, a feed signal fades.

Alternatively, such an implementation may allow for dynamic selection of the antenna or antenna assembly with the strongest communication signal capability. Additionally, in implementation, the algorithm may be set up to communicate through a default selected antenna or antenna assembly and switch to another antenna or antenna assembly only when the signal quality on the alternative antenna(s)/antenna assembly(s) is better. Moreover, the algorithm may be set up so that switching will only occur when the quality is significantly better (e.g., by a predetermined factor) to reduce unnecessary switching when quality from antenna(s)/antenna assembly(s) is virtually the same.

Transmission between the transportation vehicle(s) and the base station(s) may occur in the KU band with a secondary option being the L band.

In accordance with at least one implementation the antenna assembly used to provide communication with the base station(s) may be incorporated with one or more antenna structures used on the transportation vehicle, thus, reducing the hardware exposed on the transportation vehicle.

It should be understood that transportation vehicle operators, e.g., actual operators or carriers or other organizations controlling operation of the transportation vehicles, may use one or more communication providers, including satellite relay providers, in connection with their use of the monitoring and feedback system including one or more communication providers associated with the monitoring and feedback system.

In accordance with at least one embodiment of the invention, transportation vehicle operators may operate their own base stations with more limited support provided by the monitoring and feedback system operators. Thus, it should be understood that there may be some communication connection between the base stations and one or more remote archive facilities. Such facilities may be centralized based on geographic or political region or based on relative use of the monitoring and feedback system in particular geographic areas.

In accordance with at least one embodiment of the invention, the monitoring and feedback system may monitor and store supplemental data, i.e., transportation vehicle operational data not specifically requested by a particular operator.

Figure 2:
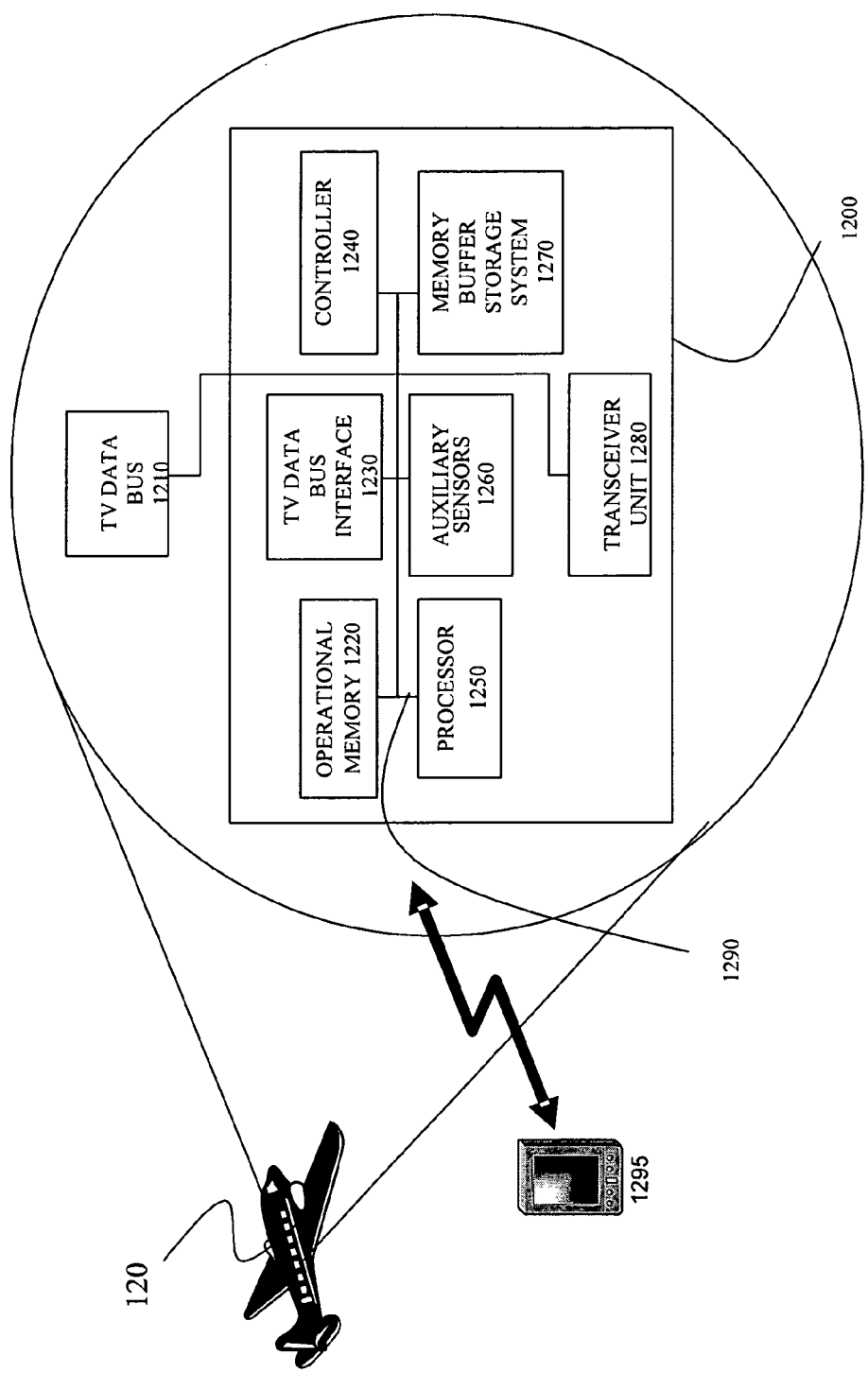
FIG. 2 illustrates a functional block diagram of one implementation of the on-vehicle component provided on a transportation vehicle in accordance with the embodiments of the invention.

FIG. 2 illustrates various sub-components that may be incorporated in the on-vehicle component 1200 of the monitoring and feedback system along with other equipment potentially used in conjunction with the on-vehicle component 1200. As illustrated in FIG. 2, the transportation vehicle 120 may include an on-vehicle component 1200 of the monitoring and feedback system 100 that may work in conjunction with a transportation vehicle data bus 1210, e.g., an FDR when the transportation vehicle is an aircraft. The on-vehicle component 1200 may include an operational memory 1220, a transportation vehicle data bus interface 1230, a controller 1240, processor 1250, auxiliary sensors 1260, a memory buffer storage system 1270 and a transceiver unit 1280. All of the elements are operationally coupled together, i.e., coupled together in such a way that the elements may cooperate, by a data/control/communication bus 1290.

As illustrated in FIG. 2, the operational memory 1220 can be implemented using any appropriate combination of alterable, volatile or non-volatile memory or non-alterable, or fixed, memory. Any alterable memory, whether volatile or non-volatile, can be implemented using any one or more of static or dynamic RAM, a floppy disk and disk drive, a writable or re-rewritable optical disk and disk drive, a hard drive, flash memory or the like. Similarly, any non-alterable or fixed memory can be implemented using any one or more of ROM, PROM, EPROM, EEPROM, an optical ROM disk, such as a CD-ROM or DVD-ROM disk, and disk drive or the like.

The operational memory 1220 stores instructions for operation of the on-vehicle component 1200. These instructions are fetched by the processor 1250 under the control of the controller 1240.

The transportation vehicle data bus interface 1230 provides an interface between the transportation vehicle data bus 1210 and the on-vehicle component 1200. It should be appreciated that the transportation vehicle data bus interface may provide an interface with a transportation vehicle data recorder, if one is present on the transportation vehicle and to sensors that conventionally provide information to meters within the operator area of the transportation vehicle, e.g., the cockpit.

The controller 1240 controls operation and co-operation of the operational memory 1220, transportation vehicle data bus interface 1230, processor 1250, auxiliary sensors 1260, memory buffer storage system 1270 and transceiver unit 1280. The processor 1250 works with the controller 1240 to control operation and co-operation of the other elements 1220, 1230 and 1250–1280. In co-operation with the controller 1240, the processor 1250 fetches instructions from the operational memory 1220 and decodes them, which may cause the processor 1250 to transfer data from the operational memory 1220, to perform data reduction techniques and/or encryption to data provided by the transportation vehicle data bus 1210 via the interface 1230, or to store such data in the memory buffer storage system 1270 or transmit it via the transceiver unit 1280.

The monitoring and feedback system may be activated upon power-up or embarkation of the transport vehicle, e.g., take-off, launch, etc. It is foreseeable that the monitoring and feedback may utilize different phases of operation. For example, on-vehicle sensors may sense power-up or embarkation and the controller 1240 illustrated in FIG. 2 may control the system to begin sensing, storing and transmitting data to the base-station 110 illustrated in FIG. 1. More specifically, when the embodiments of the invention are implemented in an aircraft, such sensors may monitor engine operation, weight or motion in wheel assemblages of the aircraft, etc., e.g., to determine when data sensing, storage and transmission should begin. Similarly, the controller 1240 may control the on-vehicle component 1200 to cease data sensing, storage and transmission based on information from such sensors, by manual control of a vehicle operator or base-station personnel, etc.

The auxiliary sensors 1260 can acquire information about the performance, operation and/or condition of the transportation vehicle that is supplementary to the data conventionally monitored by transportation vehicle systems and provided to a transportation vehicle operator, for example, via the transportation vehicle data bus 1210. For example, the auxiliary sensors 1260 may include video, audio, or audio-video data recorders installed at various locations throughout the transportation vehicle. It should be appreciated that data from such recorders may be streaming data, i.e., a sequence of "moving images", potentially with accompanying sound, that may be compressed using known compression algorithms, transmitted to the base-station component 1100 and displayed by the viewer as the images arrive, or may simply provide snap shot data that provides information about a specific instant in time on a periodic or base-station activated basis.

It is foreseeable that one or more of the auxiliary sensors 1260, for example video and/or voice recorders, may be activated by base-station personnel as necessary, and, potentially, only in the event of transportation vehicle operator authorization or some other emergency indicator.

Auxiliary sensors 1260 may include various types of sensors that are specific to types of transportation vehicles. For example, auxiliary sensors 1260 on a transportation vehicle such as a train may include one or more sensors that determine whether a train is sufficiently stable or coupled to a train track. Additionally, auxiliary sensors 1260 may include sensors for each car that indicates the weight of the car with or without cargo, what model the car is, what model an engine is, etc.

Auxiliary sensors 1260 may include sensors associated with train engines, e.g., the sensors are engine specific. Additionally, other circuitry and hardware associated with the on-board component of the monitoring and feedback system may also be incorporated in each engine. When implemented with transportation vehicles that are trains, i.e., modular transportation vehicles that change in their configuration, which may incorporate one or more engines and passenger and cargo receptacles, the on-board component may include intelligence that allows sensors included in each receptacle to interact and cooperate to monitor the train cooperatively. Thus, when more than one engine is used in a train, the hardware and software in each engine can cooperate to identify only one engine that includes hardware and software acting as the main intelligence of the train. In such an implementation, a configuration program may be run following interconnection of the constituent receptacles and engines of the train to inventory what equipment is included in the train and define how the hardware is related, e.g., how many engines are included, how many cars, the weight of each car with or without cargo, the models of the cars, etc. Additionally, this configuration may identify what engine component acts as the main on-board component of the monitoring and feedback system.

Additionally, on-board or off-board hardware and/or software may be configured to determine what a payload and/or power distribution is on the train. This information may be used by Artificial Intelligence (AI), explained in detail below, to determine an expected operation of the train and identify reasonable operation parameters for the train. These parameters may then be compared against actual operation of the train to determine whether the train is operating within expected parameter ranges, or, for example, characteristics that indicate dangerous or unexpected operation. This AI may utilize previously archived data to formulate the reasonable operation parameters for that and other trains based on the determined configuration of the train (as explained below).

Similarly, if the transportation vehicle(s) being monitored is a tractor trailer (consisting of a tractor and a trailer component), a truck, a semi-trailer, etc., auxiliary sensors 1260 may include one or more sensors that determine whether the vehicle is sufficiently stable or interacting safely with a road, by, e.g., monitoring the pressure experienced on various wheels on the vehicle to ensure that they are within industry accepted parameter ranges. Additionally, auxiliary sensors 1260 may include sensors for trailer that indicates the weight of the trailer with or without cargo, what model the trailer is, what model a tractor is, what size engine the tractor includes, etc. Further, the auxiliary sensors 1260 may include a sensor, for example a level gauge, configured to determine whether the tractor-trailer has toppled over.

Auxiliary sensors 1260 may include sensors associated with tractors, e.g., the sensors are tractor specific. Additionally, other circuitry and hardware associated with the on-board component of the monitoring and feedback system may also be incorporated in each tractor. When implemented with transportation vehicles that are tractor-trailers, i.e., modular transportation vehicles that change in their configuration, which may incorporate one or more trailers, the on-board component may include intelligence that allows sensors included in both the tractor and the trailer(s) to interact and cooperate to monitor the tractor trailer cooperatively. In such an implementation, a configuration program may be run following interconnection of the constituent tractor and trailer(s) to inventory what equipment is included in the tractor trailer and define how the hardware is related, e.g., how many trailers are included and of what they are, the weight of each trailer with or without cargo, the length of the trailer, the models of the trailer(s) and tractor, etc. Additionally, on-board or off-board hardware and/or software may be configured to determine what a payload and/or power distribution is on the tractor-trailer. This information may be used by AI, explained in detail below, to determine an expected operation of the tractor-trailer and identify reasonable operation parameters for its operation in various weather conditions. These parameters may then be compared against actual operation of the tractor-trailer to determine whether the tractor-trailer is operating within expected parameter ranges, or, for example, characteristics that indicate dangerous or unexpected operation. This AI may utilize previously archived data to formulate the reasonable operation parameters for that and other tractor-trailers based on the determined configuration of the tractor-trailer (as explained below).

In accordance with at least one embodiment of the invention, the auxiliary sensors 1260 may include sensors that detect the temperature within, for example, refrigerated or heated receptacles on the transportation vehicle, for example, in a trailer of a tractor trailer, in a truck, on a train, in a ship, an aircraft, etc. Additionally, a detection that a temperature is not within an acceptable or expected range may trigger issuance of an alert to the transportation vehicle operator to address the temperature disparity. Alternatively, or in addition, the on-board component may be configured to provide remote control of the temperature of the receptacle(s).

In accordance with at least one embodiment of the invention, the auxiliary sensors 1260 may include sensors that are configured to monitor for and detect pathogens on the transportation vehicle. Such an embodiment may be used to protect against transportation of disease bearing agents from one geographic area to another via the transportation vehicle(s). Similarly, the monitoring and feedback system may be used as one mechanism for ensuring that cargo is free of certain pathogens, for example, a shipment of cattle is transported using a transportation vehicle that is configured with sensors that monitor for various diseases. For example, the sensor(s) may be configured to sense the presence and concentration of a wide variety of specified vapors released into either the breath or body fluids of a living entity. The sensor(s) may provide these benefits using a sample chamber and a plurality of sensors located on a chip included within or adjacent to the sample chamber. Vapors are directed to pass through the sample chamber, whereupon the sensors provide a distinct combination of electrical signals in response to each. The sensors of the sensor(s) can take the form of chemically sensitive resistors having resistances that vary according to the identity and concentration of an adjacent vapor. Such an embodiment may be particularly useful to cargo transportation carriers, e.g., based on outbreaks of hoof and mouth disease.

In accordance with at least one embodiment of the invention, the auxiliary sensors 1260 may include sensors that are configured to monitor for and detect spoilage of perishable cargo in any number of ways. For example, the sensor(s) may be configured to sense the presence and concentration of a wide variety of specified vapors as resulting from gases released during either decomposition or spoilage of foodstuffs. The sensor(s) may provide these benefits using a sample chamber and a plurality of sensors located on a chip included within or adjacent to the sample chamber. Vapors are directed to pass through the sample chamber, whereupon the sensors provide a distinct combination of electrical signals in response to each. The sensors of the sensor(s) can take the form of chemically sensitive resistors having resistances that vary according to the identity and concentration of an adjacent vapor.

Embodiments of the invention that include sensors configured to detect pathogens and/or spoilage may be used to certify that cargo is free of contamination and/or decay to, for example, customs facilities, food and drug inspectors, insurance carriers. Additionally, by including sensors that may continuously monitor for indications of disease or decay, the number of personnel charged with caring for the cargo may be decreased or the level of skill of those personnel may be decreased.

As with all types of transportation vehicles, a transportation vehicle profile may be configured and associated with all monitored and archived data associated with a corresponding transportation vehicle. This transportation vehicle may include identification data as well as characteristics of the transportation vehicle, for example, engine size and other operational characteristics of a tractor. Trailers may also include some sensor or identification mechanism that may be recognized by the hardware or software of the on-board component of the trailer that allows the component to recognize and record the identity of the trailer(s) with which it is coupled and its characteristics, e.g., number of tires, axles, etc. Additionally, sensors may be included that register an amount of air pressure in tires on the trailer(s) and/or the tractor.

Similarly, transportation vehicles such as ships and aircraft may include auxiliary sensor 1260 that indicate some measure of hull integrity of the transportation vehicle, e.g., based on pressure, hull resistance, etc.

Auxiliary sensor 1260 may also include, e.g., for ships and other water craft, sensors that detect an amount of rocking of the vessel(s) to determine calmness of the water and stability of the vessel(s), sensors for measuring wind speed and direction, relative or true location of the vessel(s) (e.g., using triangulation techniques or GPS technology), sensors for measuring the amount of cargo or weight being carried on the vessel(s), etc. Additionally, the sensors may include a sensor that, once a breach in a cargo hull has been detected, e.g., by a hull integrity detector, detects an egress rate of cargo of the breached hull. This sensor may operate in combination with an algorithm that determines the amount of cargo leaving the hull of the ship based on sensed changes in water displacement of the vessel and known dimensions and configurations of the vessel.

Figure 4:
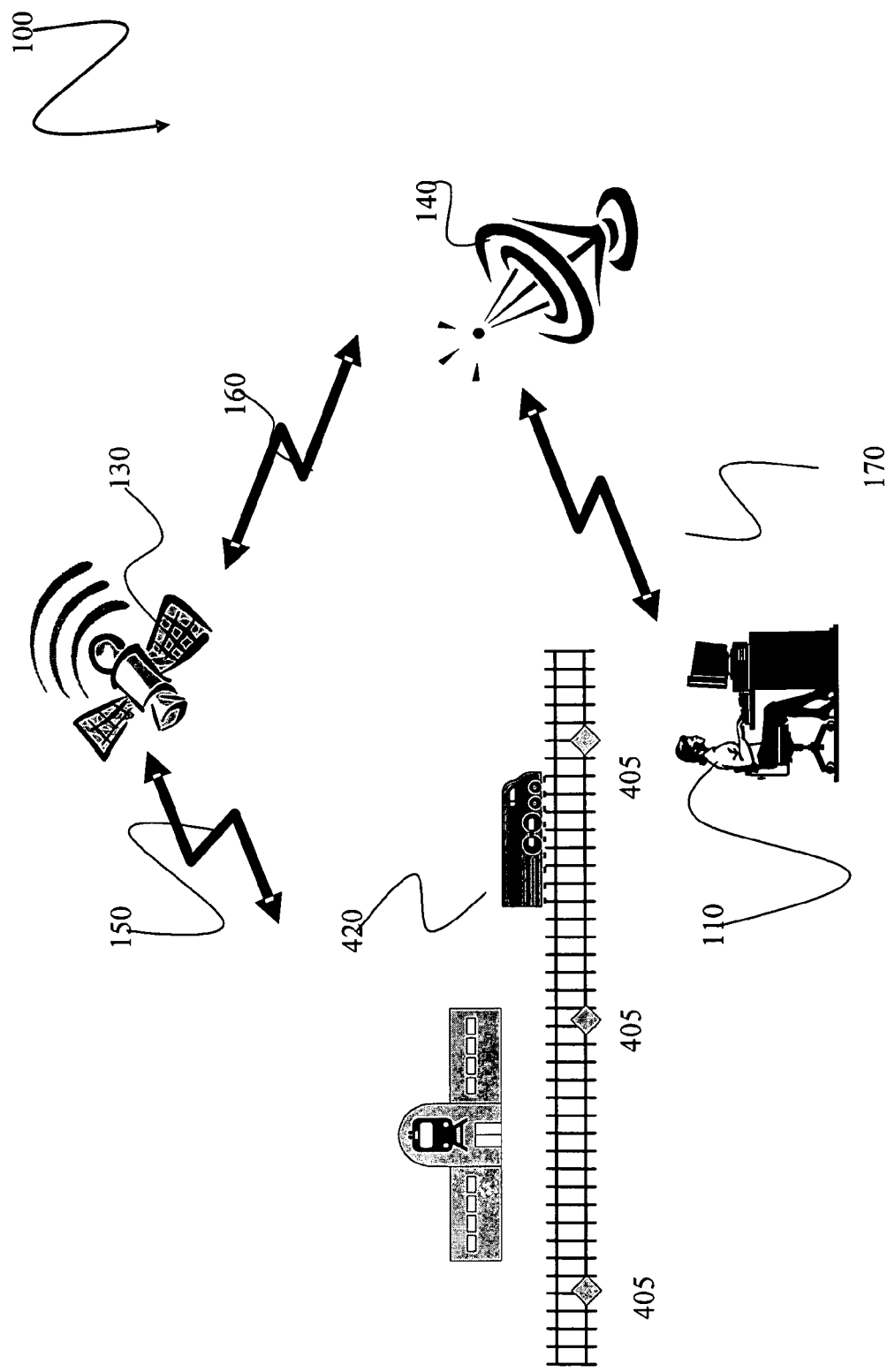
FIG. 4 illustrates a one implementation of the embodiments of the invention used in conjunction with a transportation vehicle that is a locomotive and transmission capability provided by satellite.

Additionally, the monitoring and feedback system may include or receive sensory information from sensors located off board the transportation vehicle(s) but in proximity to it. For example, the system may include or receive sensory information from sensors; see, for example, sensors 405 that indicate track condition of train tracks that indicate, for example, track conditions such as obstructions, integrity, etc that may be problematic for a transportation vehicle 420 that is a locomotive (as illustrated in FIG. 4). This information may then be used to provide real-time or near real-time feedback information to trains or train navigation controllers that may, based on that information, re-route the trains or alter the operation of the trains to accommodate for the track conditions.

The memory buffer storage system 1270 can also be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Storage and processing of monitored data may be performed to compensate or handle both metric and English units. For example, data transmitted from a particular transportation vehicle may include indicia of what data measurements are taken, the units in which the data was measured the order in which the data is transmitted, the frequency with which the data is transmitted, etc. Alternatively, all of that information may be included in a transportation vehicle profile associated with transportation vehicle identification data stored at a base station(s) and/or a centralized data archive repository(s). Both this profile and the identification data may be associated with previously monitored operation data of the associated transportation vehicle and feedback data previously provided to the transportation vehicle.

The transceiver unit 1280 is a combination transmitter/receiver and may be implemented, for example, using various communications technology such as wireless technology, including cellular telephony, radio, etc. It may be preferable for the transceiver to have full duplex capability, that is, the ability to transmit and receive simultaneously.

Upon transportation vehicle power up, or at any other appropriate time, e.g., take-off of an aircraft, launch of a nautical vessel, etc., data transmission is initiated by a data bus reader and other monitoring devices.

The content of this data transmission may also be captured by an on-vehicle memory buffer storage system 1270. It should be appreciated that the operational memory 1220, controller 1240 and processor 1250 may be incorporated in, for example, a central processing unit.

Data transmission rates may be dependent on the communications medium and signal quality available for the particular transportation vehicle. For example, an analog cellular system may be available in remote corners of Africa, which would mandate a slower, simpler installation. It should be appreciated that the transceiver unit 1280 will include some type of antenna, design of which may depend on the type of transportation vehicle using the system 100. Moreover, antenna location on the transportation vehicle may depend on the type of transportation vehicle utilizing the system 100, for example, an aircraft may need an antenna location that is certified by a regulatory authority for a range of frequencies and tested accordingly for the individual operator.

As data is being stored in the memory buffer storage system 1270, it is also transmitted in real-time, in streaming or packet burst form, to the base-station 110 via the transceiver unit 1280. This transceiver unit 1280 may include, for example, a FAA-approved antenna located on the front of the transportation vehicle when it is an aircraft. The data may be transmitted to the base-station 110 and monitored, stored, and analyzed in real-time, for example, if indicated by the transportation vehicle's service profile, explained below. Data transmission may be performed using conventionally understood methods, for example, utilizing ACARS-VHF, the Internet, WAP, and/or satellite transmission.

The data/control/communication bus 1290 operationally couples all of the elements 1220–1280 together so that the on-vehicle component may store and transmit performance, operation and/or condition data to the base-station component.

In accordance with at least one embodiment of the invention, transmission of data between the transportation vehicle(s) and base station(s) may be packet based. A packet may be thought of as the unit of data that is routed between an origin and a destination on a network, e.g., the Internet. The packet may be thought of as a chunk of a data file divided up to an efficient size for routing. Each of these packets is separately numbered and includes an address, for example, an Internet Protocol address, of the destination. The individual packets for a given file may travel different routes through the network. When they have all arrived, they are reassembled into the original file using any connection-oriented protocol (for example, by a Transmission Control Protocol layer at the receiving end).

The terms "packet" and "datagram" are similar in meaning. A protocol similar to TCP, the User Datagram Protocol (UDP) uses the term datagram and may also be used in an embodiment of the invention to provide communication between the transportation vehicle(s) and the base station(s).

In accordance with at least one embodiment of the invention, the data communicated with the transportation vehicles is encrypted, i.e., the data is converted into a form, called a ciphertext, that cannot be easily understood by unauthorized people, prior to transmission of the data. Subsequently, following reception of the data at either the transportation vehicle(s) or the base station(s), the data is decrypted, i.e., converting the encrypted data back into its original form, so it can be understood. In accordance with at least one embodiment, the data is encrypted using an encryption algorithm that is specific to the monitoring and feedback system, for example, a symmetric algorithm (same key for encryption and decryption) using block encryption (see block cipher) of 128 bits in size, supporting key sizes of 128, 192 and 256 bits. In accordance with at least one embodiment, the encryption algorithm is implemented in the hardware and software of the transportation vehicle using a plug-in application, i.e., one or more programs that can easily be installed and used as part of a Web browser and is recognized automatically by the browser, its function being integrated into a main HTML file that is being presented.

In one implementation of this embodiment, the monitoring and feedback system utilizes a key-escrow arrangement. In such an implementation, all users of the system may be required to provide the system administrator(s) with a copy of a key used by the carrier for encryption/decryption. Decryption keys may be stored in a secure place, used only by the administrator(s), and used only under specific circumstances, e.g., degradation of the user's key copy, under court order, under specific authorization of the user, etc.

In accordance with at least one embodiment of the invention, the monitoring and feedback supports Secure Sockets Layer (SSL) protocol, which is a commonly-used protocol for managing the security of a message transmission over a network, e.g., the Internet. SSL uses a program layer located between the Internet's Hypertext Transfer Protocol (HTTP) and Transport Control Protocol (TCP) layers. SSL is included as part of both the Microsoft and Netscape browsers and most Web server products. SSL uses the public-and-private key encryption system from Rivist-Shamir Aldeman (RSA) encryption and authentication system, which also includes the use of a digital certificate. Alternatively, or in addition, the monitoring and feedback system may support S-HTTP protocol.

It should be appreciated that the data provided by the transportation vehicle data bus 1210 as well as any data provided by auxiliary sensors 1260 may be compressed prior to transmission to the base-station 1100 and storage in the memory buffer storage system 1270. Accordingly, it should be appreciated that the data may be compressed using either a lossy or lossless compression algorithm run by the processor 1250 base on instructions stored in the operational memory 1220 under the direction of the controller 1240.

It may be preferable for compression performed on the data that is stored in the memory buffer storage system 1270 be performed using a lossy compression algorithm whereas the same data is compressed using a lossless compression algorithm prior to transmission to the base-station. Such an implementation may be preferable, for example, when there is an increased interest in particularly accurate archival data stored at the base-station. Alternatively, it may be preferable for compression performed on the data that is stored in the memory buffer storage system 1270 may be performed using a lossless compression algorithm whereas the same data is compressed using a lossy compression algorithm prior to transmission to the base-station. Such an implementation may be preferable, for example, when the amount of bandwidth available for transmission of data to the base-station is limited.

Moreover, data may be compressed using conventional data reduction technologies that transmit only a delta or change in a data parameter rather than resending the data parameter itself. Such technologies may be particularly beneficial for implementation by the on-vehicle component 1200 for transmitting, for example, video data. Conventional data reduction technology may involve extracting raw data from a data stream using, for example, ARINC® 429 code conversion algorithms for transportation vehicles that are aircraft. When data reduction technology is implemented in the on-vehicle component 1200, the base-station component 1100 may include modeling software and mathematical processing algorithms for converting this raw data into performance information.

Thus, in accordance with at least one embodiment of the invention, data transmitted between the transportation vehicle(s) and base station(s) may be compressed prior to transmission and decompressed subsequent to transmission. The compression/decompression may be implemented using various compression/decompression schemes. Although the compression/decompression may be implemented using a lossless or a lossy technique, lossless may be preferred if data integrity is important. The compression may be used to reduce the size of data in order to save space or transmission time. For data transmission, compression can be performed on just the data content or on the entire transmission unit (including header data) depending on a number of factors.

In accordance with at least one embodiment of the invention, monitoring data may be transmitted to the base station(s), at which analysis is performed to determine, for example, whether the vehicle is operating under acceptable and/or expected conditions. Alternatively, data may be pre-processed on the transportation vehicle(s) so that only data associated with operational parameters that have not been met are transmitted to the base station. In such a situation, the transportation vehicle may transmit data that indicates operational characteristics that have been identified. For example, a vehicle that is operating at an acceptable or expected speed but an unacceptable or unexpected fuel consumption, may only transmit information indicating that there is an unacceptable fuel consumption. The information regarding the speed may be discarded, archived, or transmitted at a lesser frequency than the data associated with problematic parameter values. Such an embodiment may provide a reduced necessity to compress data because the amount of data transmitted to the base station(s) would be reduced.

In accordance with at least one embodiment of the invention, transmission of data may from the transportation vehicle to the base station may be repeated multiple times, for example, five times. In such an embodiment, the data is analyzed to pick from among the multiple sets of data to identify the best set of data for subsequent analysis and use in the monitoring and feedback system. This selection of "best" data may be performed in any number of ways.

For example, the determination may be based on one or more reasonable parameter ranges. Thus, for example, a set of data may include a plurality of monitoring and/or feedback parameters. One or more of these parameters may be checked against corresponding parameter ranges that have been predetermined to contain reasonable or expected values. Based on whether the parameter(s) included in the data sets fall within the predetermined range, one or more data sets may be selected as being appropriate for subsequent use in analysis.

Alternatively, the determination of which data set(s) is best may be based on previously received data. For example, a data set (presumably previously identified as being accurate or being the best from among a plurality of data sets) sent at time n may be compared with the plurality of data sets transmitted at time n+1. That is, one or more parameter values may be compared between time n and n+1 to determine whether the data is reasonable. Such a configuration would allow the ability to determine whether the data set indicates too wide a fluctuation than is possible. For example, an aircraft speed at time n being reported as 425 mph but 756 mph at time n+1. As an example of a data range of fluctuation between time n and n+1, an algorithm may be set up to discount a data set in which the speed parameter changes by, for example, more than 20%, or alternatively, for example, more than 50 mph. It should be understood that time times at which data are sent may or may not be continuous; therefore, for example, data may be transmitted, for example, continuously, every 2 seconds, every minute, etc.

A third option is to use a check sum to indicate the integrity of the data sets transmitted between the transportation vehicle and the base station. A checksum is a count of the number of bits in a transmission unit that is included with the unit so that the receiver can check to see whether the same number of bits arrived. For example, in the present situation, the checksum could include the number of bits in one or more parameters or in an entire data set. If the counts match, it's assumed that the complete transmission was received. Both Transmission Control Protocol and User Datagram Protocol communication layers provide a checksum count and verification as one of their services.

It is foreseeable that the on-vehicle component 1200 of the monitoring and feedback system 100 may be implemented in a general purpose computer, a special purpose computer and/or one or more Application Specific Integrated Circuits (ASICs), for example, a combination of ASIC and flash memory chips.

It is foreseeable that the on-vehicle component 1200 may receive transportation vehicle data sent to the TVDR, if one is included on the vehicle, via the transportation vehicle data bus 1210. Subsequently, the on-vehicle component 1200 of the system may transmit the flight data and store it in the memory buffer storage system 1270 illustrated in FIG. 2.

The equipment incorporated in the on-vehicle component 1200 of the system may be powered either from a transportation vehicle specific source or independently using a minimum power consumption level. The duality of the real-time data storage on the transportation vehicle and at the base-station provides efficient, easily accessible and virtually instant data retrieval capabilities.

The on-vehicle component 1200 may require no transportation vehicle operator monitoring at any time. In such an implementation, a transportation vehicle operator may be contacted by base-station personnel or an automated algorithm running at the base-station only when transportation vehicle operation, performance or condition criteria do not meet acceptable parameters. However, it should be appreciated that a panel mounted display unit may be incorporated in the on-vehicle system component to provide status information to the crew. The transportation vehicle data transmitted from the on-vehicle component 1200 to the base-station 110 may be archived at the base-station 110 and processed to display the data in pre-determined formats to show transportation path profiles and transportation vehicle operation. Moreover, basic trend monitoring may be performed to provide transportation vehicle fleet profile comparison analysis.

Figure 3:
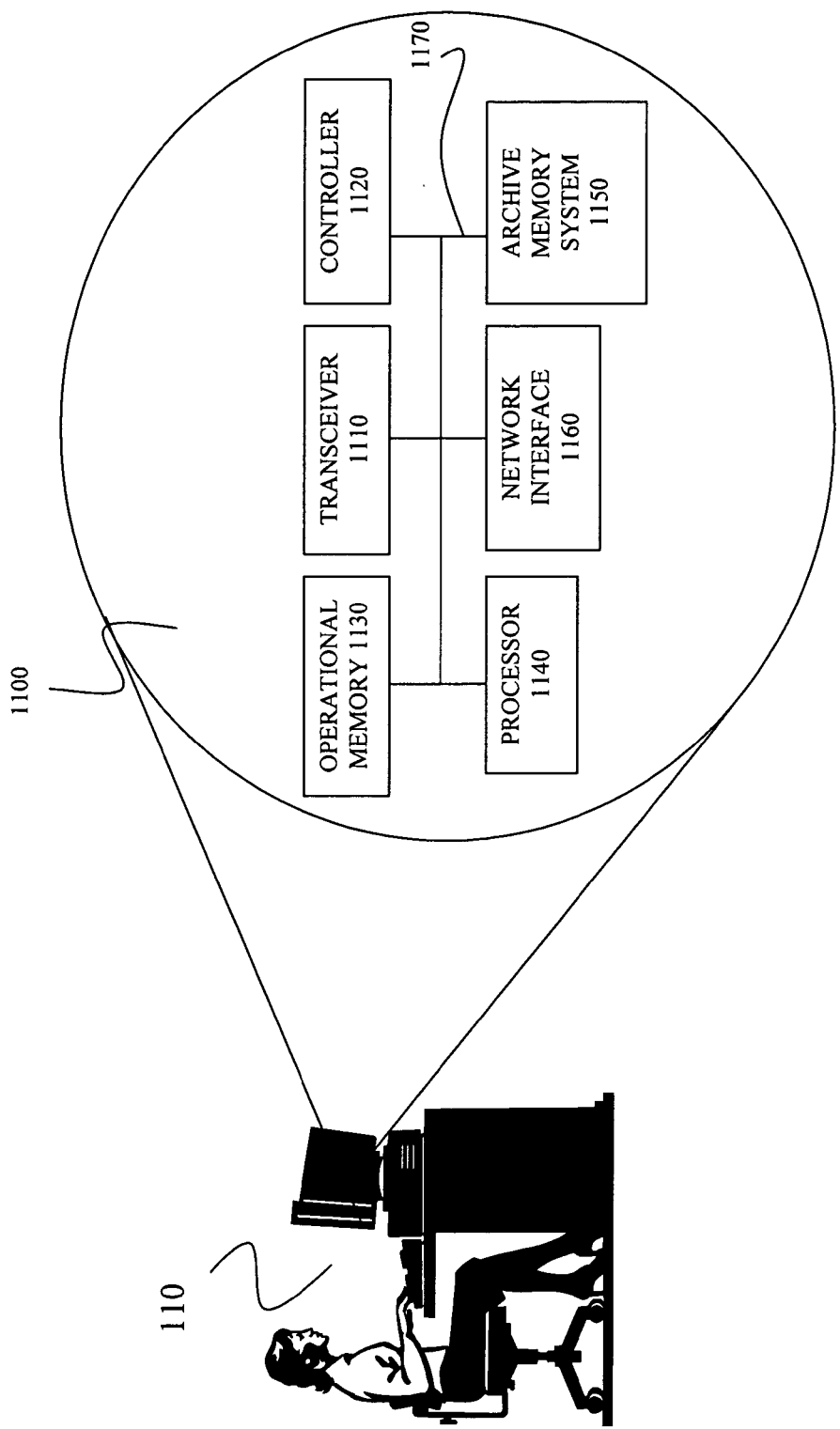
FIG. 3 illustrates a functional block diagram of one implementation of the base-station component provided to monitor and provide feedback to the transportation vehicles.

As illustrated in FIG. 3, the base-station 110 includes a base-station component 1100 of the monitoring and feedback system 100 that may include, for example, a transceiver 1110, controller 1120, operational memory 1130, processor 1140, archival memory system 1150 and network interface 1160. All of the elements are operationally coupled together, i.e., coupled together in such a way that the elements may cooperate, by a data/control/communication bus 1170.

The transceiver 1110 provides the software and hardware for interfacing with the antenna 140 illustrated in FIG. 1. Similarly to the transceiver unit 1280, the transceiver 1110 may be implemented, for example, using various communications technology such as wireless technology including, e.g., cellular telephony, radio, etc. It may be preferable for the transceiver 1110 to be configured to provide full duplex capability, that is, the ability to transmit and receive over antenna 140 simultaneously. Additionally, data transmission rates shall be dependent on the communications medium and available signal quality. Feedback data transmission may be performed using conventionally understood methods, for example, utilizing ACARS-VHF, the Internet, WAP, and/or satellite transmission.

It should be appreciated that the feedback data generated by the base-station component 1100 may be compressed prior to transmission from the base-station 1100 and storage in the archive memory system 1150 using either a lossy or lossless compression algorithm.

Moreover, data to be transmitted may be reduced using conventional data reduction technologies that transmit only a delta or change in a data parameter rather than resending the data parameter itself. Additionally, it is foreseeable that the feedback data may be encrypted prior to transmission to the transportation vehicle 110.

The operational memory 1130 can be implemented using any appropriate combination of alterable, volatile or non-volatile memory or non-alterable, or fixed, memory. Any alterable memory, whether volatile or non-volatile, can be implemented using any one or more of static or dynamic RAM, a floppy disk and disk drive, a writable or re-rewritable optical disk and disk drive, a hard drive, flash memory or the like. Similarly, any non-alterable or fixed memory can be implemented using any one or more of ROM, PROM, EPROM, EEPROM, an optical ROM disk, such as a CD-ROM or DVD-ROM disk, and disk drive or the like. The operational memory 1130 stores instructions for operation of the on-vehicle component 1100.

The controller 1120 controls operation and co-operation of the operational memory 1130, processor 1140, the archive memory system 1150 and the network interface 1160. The processor 1140 works with the controller 1120 to control operation and co-operation of the other elements 1110, 1130, 1150 and 1160. In co-operation with the controller 1120, the processor 1140 fetches instructions from the operational memory 1130 and decodes them, which may cause the processor 1140 to transfer data from the operational memory 1130, to perform, for example, decompression techniques or decryption techniques to decompress or decrypt data transmitted from the on-vehicle component 1200, or to store such data in the archive memory system 1150.

Moreover, the processor 1140 may fetch instructions from the operational memory 1130 to perform analysis of data stored in the archive memory system 1150 so as to compare data received from the on-vehicle component 1200 with parameters to help ensure that the transportation vehicle is operating, performing or is in a condition that is acceptable. For example, the processor 1140 may determine whether a transportation vehicle is maintaining the path indicated by its travel plan, for example, a flight plan, anticipated route via road, or navigation plan, based on information received from the on-vehicle component 1200 and, for example, information from a GPS or LEO satellite.

The archival memory system 1150 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The archival memory system 1150 may be significantly large in size to store transportation vehicle data for both multiple trips by particular transportation vehicles and for multiple transportation vehicles as well. Thus, the storage capability for the archival memory system 1150 may be many Gigabytes or larger.

The network interface 1160 may provide access to additional information that may be used by base-station personnel or algorithms run via the processor 1140 on the base-station component 1100 of the monitoring and feedback system to determine weather a transportation vehicle is operating outside predetermined parameters. Such parameters may be set to help ensure that transportation vehicles operate in a safe manner, e.g., to avoid a potential accident, an efficient manner, e.g., for the purpose of fuel or time efficiency, an instructed manner, e.g., when specific transportation vehicles should only operate at a specific speed, altitude, etc. based on characteristics of the transportation vehicle and, for example, environmental conditions such as wind speed, precipitation, temperature, turbulence, etc. The additional information provided via the network interface 1160 may include meteorological information, routing information, traffic patterns, transportation path closures, etc. The network interface 1160 may provide access to a public and/or private communication network, for example, a wide area network, local area network, an Intranet, the Internet or any other private and/or public transportation network.

The control/data/communication bus 1170 operationally couples all of the elements 1110–1170 together so that the on-vehicle component may store and transmit performance, operation and/or condition data to the base-station component.

The controller 1120, operational memory 1130, processor 1140 and network interface 1160 may be implemented in a PC workstation with, for example, a Windows® operating system, proprietary data processing software and video processing capabilities. Because standard transmission and data storage equipment may be used to implement the base-station component 1100 of the monitoring and feedback system, software/hardware updates and system maintenance can be performed regularly and proficiently.

One key feature of at least one of the embodiments of the invention is the resulting reliability of data collection and feedback analysis provided to transportation vehicle operators. With reliability comes dependability and accuracy.

At least one of the embodiments of the invention is designed to work in conjunction with transportation vehicle recorders such as FDRs. The on-vehicle component 1200 of the system in such an embodiment is specifically designed to capture data "behind" the transportation vehicle recorders so as not to interfere with proven data collection environments. In this way, that embodiment works in conjunction with the transportation vehicle recorders instead of interfering with them.

Moreover, the on-vehicle component 1200 of the monitoring and feedback system 100 may be implemented with a minimum number of moving parts so as to minimize mechanical failure resulting from the inevitable erratic movement experienced by transportation vehicles 120. Additionally, at least one embodiment of the invention may be implemented such that any or all of the moving parts are, in effect, a backup system should the capability to transmit data from the transportation vehicle 120 to the base-station 110 be unavailable for some reason.

Systems and methods designed in accordance with the embodiments of the invention may be advantageously implemented with a transportation system that prevents transportation accidents, such as controlled flight into terrain (CFIT) accidents.

The impacts of the embodiments on the passenger transportation industry are numerous. For example, with reference to air transportation, a study of 1,039 aircraft accidents taken from the Aviation Accident Database between 1997 and 1999, 22% were identified as the result of mechanical failure, 10% were due to sabotage and 20% were due to weather. According to this data, potentially 52% of large-scale aircraft casualties resulting in lost lives could have been avoided if equipment failures and weather conditions could have been monitored in real-time and actions could have been taken to correct the situation. According to the same study, 46% of the aircraft accidents were attributed to human error. Again, the potential for savings in lost lives is immeasurable, simply by recognizing procedural or navigational errors before they result in objectionable and adverse results.

Moreover, the other benefits that may conceivably result from implementation of the embodiments of the invention are numerous.

First, transportation vehicles implementing systems designed in accordance with the embodiments of the invention may be able to have systems customized by selecting higher or lower data transmission rates, higher or lower data storage capacities in either or both on-vehicle and base-station equipment, and selection of additional data analysis tools, e.g., topographical data, weather data, etc. The operational memory 1130 of the base-station component 1100 and/or the operational memory 1220 of the on-vehicle component 1200 may include service profile data that may include, for example, (1) an indication of a particular data transmission rate for communicating on an up-link from the base-station to the transportation vehicle, on a down-link from the transportation vehicle to the base-station, or both; (2) an amount of maximum data storage to be maintained at the base-station for down-loading from the transportation vehicle; (3) a selection of which transportation tools may be utilized in conjunction with analysis performed at the base-station on the data down-loaded by the transportation vehicle to the base-station.

Moreover, it is foreseeable that a particular transportation vehicle's service profile may include identification of specific auxiliary sensors 1260 incorporated in the on-vehicle component 1200. It is foreseeable that at least one-hundred-and-fifty parameters may be monitored by the base-station 100. Therefore, the service profile may be customizable because, for example, the transportation vehicle data bus 1210 incorporated within a transportation vehicle can be programmed to extract whatever data set the on-vehicle component 1200 requests.

This opportunity to customize implementation of a system designed in accordance with the embodiments allows transportation vehicle operators to implement a scalable monitoring and feedback system at a lower cost while allowing for adding system options at some time subsequent to initial implementation of the system.

Second, individual, and non-commercial vehicle transportation operators presently without the means of providing their own base-station can effectively share these facilities and resources with other individual, and/or non-commercial vehicle transportation operators at an affordable cost.

Third, implementation of systems and methods designed in accordance with the embodiments may be quickly recognized by the insurance industry as a tool for ultimately reducing their payout risk. As result, transportation operators and carriers may have lower insurance premiums.

Fourth, when the aviation industry introduces trans-polar flights, previously unavailable flight route information will be immediately accessible. Presently, the polar regions are very poorly covered by high-quality communications, and extensive use is still made of HF. Data transmission for transportation vehicle tracking purposes is therefore poor. Access to an LEO transmission and communication facility will greatly improve polar region monitoring.

Although presently there are other known methods of capturing flight data information, most of these differ significantly from the embodiments of the invention because they do not consider real-time data transmission. Moreover, these other systems are not directed at storing long term information for the purposes of performing performance, operation and condition analysis of one or more transportation vehicles.

The embodiments of the invention may utilize a standard computer, video and transceiver equipment, such as FAA-approved transceiver equipment, to monitor and relay data transmissions between transportation vehicles and base stations, as well as store these transmissions both on-vehicle and at the base-station for archival purposes.

Moreover, such archived data may be used for route cost proving, i.e., the ability to compare actual transportation vehicle performance, and therefore operating costs, against the predicted transportation vehicle economic model for the route hence providing a real time validation of predicted costs.

As mentioned above, the embodiments of the invention may be used as a tool for averting transportation vehicle accidents. Data transmitted in real-time to the base-station 110 from the transportation vehicle 120 may be monitored by base-station personnel, and/or automated and/or semi-automated base-station equipment. As a result, the base-station personnel, and/or automated and/or semi-automated base-station equipment may identify any deviation of performance, operation or condition data from acceptable parameters more quickly. As a result, real-time monitoring of the performance, operation and condition of the transportation vehicle 120 by the base-station component 110 allows the identification and diagnosis of malfunction of equipment incorporated in the transportation vehicle 110 as well as transportation vehicle operator error.

Therefore, such monitoring provides the ability to provide real-time feedback to transportation vehicle operators. With such feedback comes an increased capability to minimize, correct, or compensate for potentially problematic scenarios on the transportation vehicle. The potential benefit of such monitoring and feedback capability may be readily appreciated if, for example, a fire has occurred in a cargo hold of an aircraft or shipping vessel. By monitoring these areas, the system is able to provide information to allow transportation vehicle operators to take necessary steps to avert accidents.

As mentioned above, the embodiments of the invention may be used as a tool for investigation of transportation vehicle accidents. In the event of a transportation vehicle accident, investigation may begin immediately because data has been captured and stored real-time in an immediately accessible location. Thus, the dependency on a missing transportation vehicle recorders for accurate information is minimized.

As mentioned above, the embodiments of the invention may be used as a tool for profiling operation and performance of transportation vehicles.

The embodiments of the invention may receive performance, operation and condition data from existing sensor outputs, e.g., existing flight sensors in an aircraft as well as the Flight Management System (FMS). However, although not required for implementation of all of the embodiments of the invention disclosed herein, the on-vehicle component 1200 of the monitoring and feedback system may incorporate auxiliary sensors 1260. Thus, sensors may be incorporated within and on the exterior of the transportation vehicle. Such sensors may include, but are not limited to, sensors for monitoring wind sheer, lift, cross-winds, pitch, roll, etc., for aircraft, water temperature, pitch, roll, etc. for watercraft, speed, momentum, braking efficacy, etc. for land-based vehicles, or any other characteristic that may be indicative of environmental effects on a transportation vehicle.

In accordance with at least one embodiment of the invention, the monitoring and feedback system may also include a database of rules developed in part and/or used by Artificial Intelligence (AI) in the form of an expert system incorporated in the transportation vehicle monitoring, feedback and control system to create a system that may automatically respond to or display helpful assistance to event(s) that have occurred based on archived information indicating at least one previous occurrence of the event(s) and the action(s) that were previously taken in response. For example, the archived information may include information indicating a past occurrence of a particular event or set of events and the action or set of actions that were initiated by a pilot of the same transportation vehicle, type of transportation vehicle, or a similar transportation vehicle, to successfully respond to that event or set of events, Similarly, the archived information may include information indicating a past occurrence of a particular event or set of events and the action or set of actions that were initiated by a pilot of the same transportation vehicle, type of transportation vehicle, or a similar transportation vehicle, that were unsuccessful in responding to that event or set of events.

Further, the event or set of events need not be completely identical to a previous event or set of events. Rather, the previous event or set of events need only be sufficiently similar to be relevant. One measure of similarity may be provided by determining how many factors are variable in the present scenario and determining how many of the variable factors have identical or sufficiently similar values. A determination of whether a variable factor has a present value that is sufficiently similar to a past value may be made be comparing the present value with the past value to determine whether the present value is within a predetermined acceptable variation range from the past value. For example, if the variable factor is 20,000 feet altitude, a predetermined acceptable variation range may be 19,500 to 20,500 feet altitude. Therefore, if archived scenario information indicates a scenario in which the altitude is 20,000 feet, than a present value of the altitude should be between 19,500 and 20,500 feet to be deemed sufficiently similar to the previous value of 20,000 feet for the purposes of determining similarity of scenario.

The expert system may generate or use rules formulated based on archived scenario information. For example, such rules may be formulated based on measured parameters obtained either directly or inferentially, by examining active devices and components based on simulated evolution and using algorithms to determine the best response for one or more components of the vehicle to respond to.

Such an expert system may learn (e.g., acquire information and rules for using the information), reason (e.g., use the rules to reach approximate or definite conclusions), and perform self-correction. Such an expert system may be implemented in, for example, one or more computer programs that simulate the judgement and behavior of a human or an organization that has expert knowledge and experience operation of a particular transportation vehicle, a particular type of transportation vehicle, various groups of transportation vehicles, generally or in specified scenarios, e.g., electrical storms, high winds, low visibility, extreme turbulence, etc.

The expert system may include or utilize a knowledge base containing accumulated experience and a set of rules for applying the knowledge base to new situations. Some part or all of the knowledge base containing accumulated experience may be included in the archived scenario information. Alternatively, the knowledge base containing accumulated experience may include some part or all the archived scenario information. The set of rules for applying the knowledge base to new situations may include rules indicating how the knowledge base is applied to new situations by including rules indicating how the knowledge base is applied to each particular situation that is described.

The one or more computer programs may use previously determined rules based on natural selection, crossover, and mutation to arrive at a solution that best satisfies the situation the vehicle finds itself in at that present time. This information may be used as an alert either aurally, visually or to manage the vehicle based on previously stored data retrieved by event and value. Alerts may be generated based on industry supported parameters; for example, if a transportation vehicle is operating outside of generally accepted parameters, an alert may be generated to the vehicle crew and/or base station or other personnel. The present situation and result may then be input into the archived information to build the database for future use by either the same vehicle or any other similar vehicle on the same neural network. Over time, a number of above-average solutions increases, and better-fit solutions may be created, until a good solution to the problem at hand is found.

As a result, at least one embodiment of the invention provides a navigation system that includes an expert system that collects, stores and analyzes scenario data associated with operation of one or more transportation vehicles. Analysis may include formulation of expert system rules used to analyze the scenario data and additional scenario data collected during further operation of the one or more transportation vehicles.

It should be appreciated that, such expert systems may be used to assist in or control operation of one or more transportation vehicles after a period of time that allows the expert system to become sufficiently adept at assisting or controlling transportation vehicle operation. For example, a set of operation controlled by a pilot of a Boeing 747 aircraft, flying from Atlanta to Washington, D.C., may be stored using a navigation system according to one embodiment of the invention. Subsequently, that set of operations may be used to suggest operations to a pilot of that aircraft or another Boeing 747 aircraft from Atlanta to Washington, D.C. Moreover, a set of operations controlled by many pilots in a particular plane, or type of plane on a particular route may be used to formulate suggested operations to a pilot of that plane or type of plane.

In accordance with at least one embodiment of the invention, the navigation system, including an expert system, may be configured to operate as a warning system under a transportation vehicle crew's control. Such a system may be configured to provide suggested operations or sets of operations via, audio, visual, or audiovisual messaging. Thus, the navigation system may include, and the expert system may control or be coupled to, for example, one or more speakers, one or more video screens, one or more graphical user interfaces, etc.

In accordance with at least one embodiment of the invention, the navigation system, including an expert system, may be configured to initiate corrective control operation of one or more transportation vehicles. For example, if the expert system determines that one or more operations initiated by the crew of the transportation vehicle would be inadvisable, the expert system may be configured to prohibit that operation and/or initiate an alternative more advisable operation. Alternatively, or in addition, if the expert system determines that one or more operations should be initiated by the crew of the transportation vehicle, the expert system may be configured to initiation those operations.

In accordance with at least one embodiment of the invention, the navigation system, including an expert system, may be configured to solely control operation of one or more transportation vehicles. In such an embodiment, the navigation system may also include vision and various other systems for remote vehicle control using, for example, neural and cellular networks and evolutionary computation.

Such embodiments may be used in an aircraft experiencing various expected or unexpected scenarios. For example, when an aircraft encounters turbulence, the system may be able to provide the aircraft with archived scenario information, one or more possible operations to be initiated, one or more sets of possible operations to be initiated, etc. These suggested or possible operations may be formulated based on previously archived scenarios that are similar to one presently being experienced by the aircraft. For example, a same or similar degree of turbulence may have been experienced by the same aircraft, a same type of aircraft or a similar type of aircraft. As a result, the expert system could provide suggested operation(s) to handle the present scenario. Alternatively, the expert system could control the aircraft to some extent to either initiate or prohibit certain operation(s) based on the archived scenario information and any operation rules based on that previously archived scenario information. For example, the expert system may recognize that, based on the previously archived scenario information, and the characteristics of the present situation sensed by, for example, on-board sensors, the flaps may be adjusted in a specific manner to minimize the jerkiness felt during turbulence making the flight smoother.

As another example, suppose an aircraft experiences a tire blow out on take-off. By virtue of implementing an embodiment of the invention, the crew members and/or ground personnel (e.g., base station personnel and other individuals and organizations associated with the operation, maintenance and safety of the transportation vehicle) have access to previous information on similar situations for the same or a similar model aircraft with similar payloads. This archived scenario information may have been provided by implementing an embodiment of the invention to at least monitor the operation of this or other transportation vehicles.

As a result, the crew and ground personnel may have access to the scenario information that indicates transportation vehicle configurations at landing for previous scenarios, including, for example, results, flaps angles, speed of aircraft, type of aircraft, destination of aircraft, spoiler configurations, weather conditions and a host or other relevant information on the actions taken in previous takeoffs. The crew and/or ground personnel may also have access to suggested operation(s) to be undertaken in the present scenario to address the present issue(s).

Such an expert system used in combination with a transportation vehicle has various areas of utility which are not limited to use in aircraft. For example, suppose a ship out on the ocean hits an object, thus rupturing the hull. As a result of the rupture, the ship is taking on water and listing to the port side. By virtue of implementing an embodiment of the invention, the ship crew members and/or other off-ship personnel (e.g., coast guard personnel, harbor masters, and/or other individuals and organizations associated with the operation, maintenance and safety of the transportation vehicle) have access to previous information on similar situations for the same or a similar model ship with similar payloads.

This archived scenario information may have been provided by implementing an embodiment of the invention to at least monitor the operation of this or other transportation vehicles. As a result, the crew and/or off-ship personnel may have access to the scenario information that indicates transportation vehicle operations that may be taken to remedy the large amount of water being taken on, the listing of the ship, or any resulting environmental degradation occurring as a result of a collision for previous scenarios, including, for example, results, ballast tank operations, speed of the transportation vehicle, type of ship, size of ship, location of ship, motor configurations, amount of cargo, location of cargo, amount of fuel, weather conditions and a host or other relevant information on the actions taken in previous collision scenarios. The crew and/or off-ship personnel may also have access to suggested operation(s) to be undertaken in the present scenario to address the present issue(s).

Implementing an embodiment of the invention including an expert system may also allow a pilot approaching an airport for the first time in inclement weather to access a calculated landing based on previous experiences for similar aircraft in similar conditions. By virtue of implementing an embodiment of the invention, the pilot and other crew members and/or other ground personnel may have access to previous information on similar situations for the same or a similar model plane at this particular airport.

This archived scenario information may have been provided by implementing an embodiment of the invention to at least monitor the operation of this or other planes. As a result, the crew and/or ground personnel may have access to the scenario information that indicates transportation vehicle operations that may be taken to safely navigate the plane into the airport for previous scenarios, including, for example, results, speed of the aircraft, decent, type of plane, identity of plane, time of day, size of plane, age of plane, weight of plane, number of passengers, location of cargo, amount of fuel, weather conditions and a host or other relevant information on the actions taken in previous landing scenarios. The crew and/or ground personnel may also have access to suggested operation(s) to be undertaken in the present scenario to address the present issue(s).

Such a navigation and monitoring system may also be implemented to control the operation of the transportation vehicle to some extent. For example, the system may be used in a situation in which a public transport vehicle experience a tire blowout. In accordance with at least one embodiment of the invention, the system may be configured to automatically formulate braking and steering operations that would most likely bring the vehicle to a stop whilst restricting the driver from making fatal mistakes like braking too hard. By virtue of implementing an embodiment of the invention, the system may have control to initiate specific actions and to prohibit specific actions based on previously archived scenario information on similar situations for the same or a similar transportation vehicles. As a result, an operator of the vehicle may be guided or constrained by the operation of the system based on past experience that was learned by the expert system.

This archived scenario information may have been provided by implementing an embodiment of the invention to at least monitor the operation of this or other transportation vehicles. As a result, the vehicle operator, and his/her passengers, may benefit from the experience of other operators using previously archived scenario information that indicates transportation vehicle operations that may be taken to bring transportation vehicles to a safe stop in previous scenarios, including, for example, results, speed of the transportation vehicle, type of transportation vehicle, size of transportation vehicle, location of vehicle, inclination of the surface or surfaces on which the vehicle is driving, number of passengers, number of tires, type of tires, amount of inflation of tires, braking speed, steering angle or angles, amount of fuel, weather conditions and a host or other relevant information on the actions taken in tire blow out scenarios.

Similarly, personal cars may be fitted to include a system designed in accordance with an embodiment of the vehicle monitoring and feedback system. For example, a car monitored by such a system, on encountering an ice patch, may be controlled under the guidance of the system such that the system automatically references similar instances on the same road or a similar road when cars of a same or a similar type and configuration encountered the situation, and may, based on present environmental conditions, formulate and initiate action to stabilize the car. Similarly, suppose an aircraft looses its engines and is forced to make an emergency landing over water. If such an aircraft is monitored by a system designed in accordance with one of the embodiments of the invention, the system may formulate one or more best possible angles of dissent for the aircraft based on references with previous instances and weather conditions and present configurations and assist the pilot to make a safe landing.

It should be understood that any expert system explained above may be implemented using a combination of operation memory 1220, controller 1240, processor 1250, auxiliary sensors 1260, memory buffer storage system 1270 illustrated in FIG. 2, among other features, if necessary. Additionally, the expert system may also, or alternatively, use the operational memory 1130, controller 1120, processor 1140 and archive memory system 1150 illustrated in FIG. 3, among other features, if necessary.

In accordance with at least one embodiment of the invention the monitoring and feedback system is compatable with the Bluetooth industry specification, which is a computing and telecommunications industry specification that describes how mobile phones, computers, and personal digital assistants interconnect with each other and with home and business phones and computers using a short-range wireless connection. Thus, passengers' mobile phones, computers, personal data assistants, pagers and other personal computing and telecommunication equipment may be.

Additionally, it is foreseeable that the on-vehicle component 1200 may be configured to allow for a technician to transfer data from the on-vehicle component to a hand held device (see 1295 illustrated in FIG. 2) using a Bluetooth or other wireless transfer protocol or technology. Such a hand held device may include analysis software that may allow for the analysis of data transferred from the on-vehicle component 1200, e.g., some or all of the analysis performed in the base station component 1100.

In accordance with at least one embodiment of the invention, the on-board component includes a network, e.g., a local area network or virtual area network, which allows, for example, cooperation, communication and interaction of components of the on-board component, including sensors and interfaces, as well as other on-board equipment. In such an implementation passengers may have access to the capability of printing out electronic mail, sending and receiving faxes, sending and receiving e-mail, browsing public or private networks, etc., via personal data assistants, personal computers, phones, pagers, user interfaces built into the transportation vehicle, or any other device located on-board the transportation vehicle(s).

Figure 5:
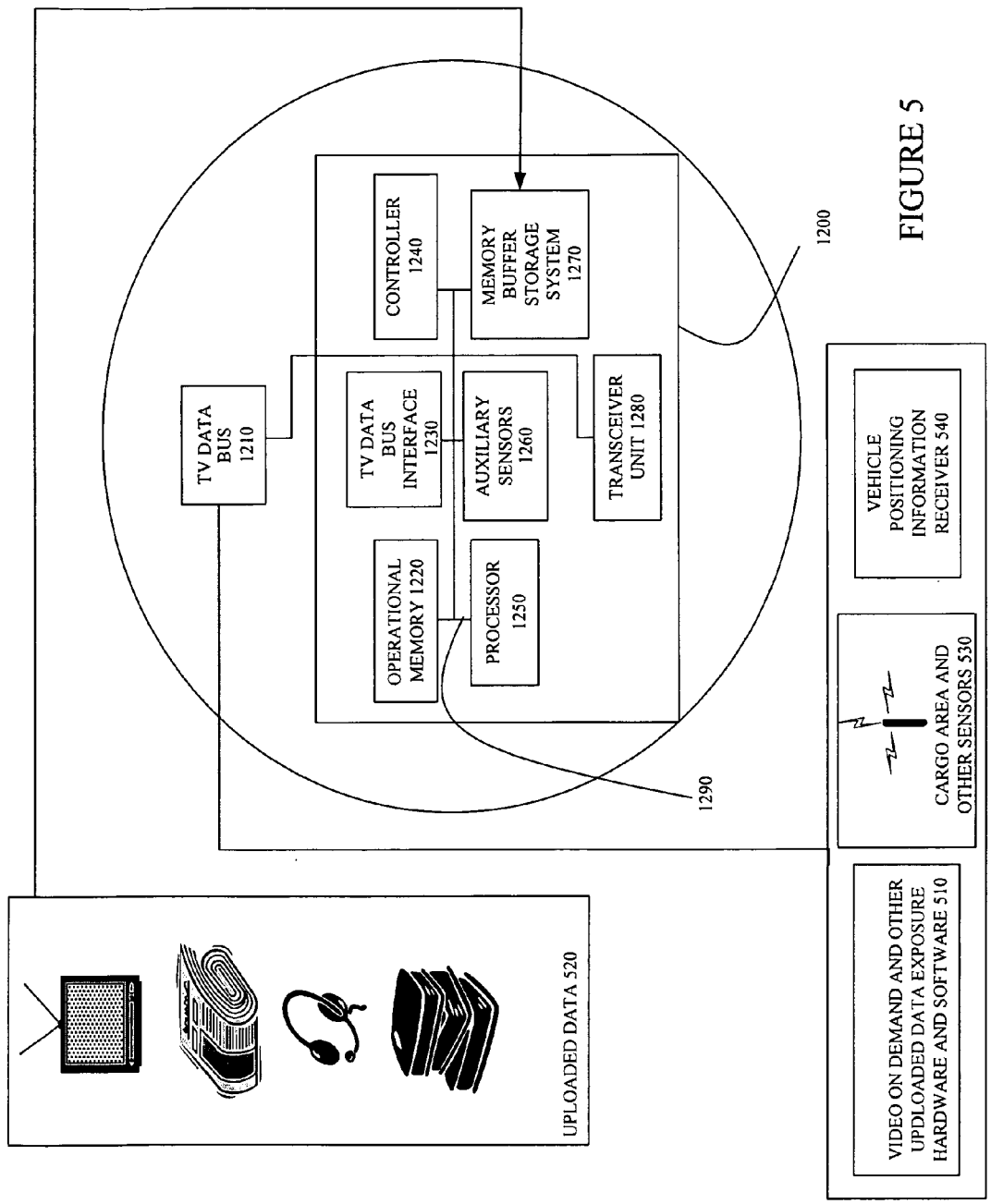
FIG. 5 illustrates additional details of one implementation of the on-vehicle component provided on a transportation vehicle in accordance with the embodiments of the invention.

At least one embodiment of the invention may be used in combination with or include hardware, software and functionality associated with video-on-demand capability (see, for example, video-on-demand and other uploaded data exposure hardware and software 510 illustrated in FIG. 5). That is, the transportation vehicle may be equipped with equipment, e.g., 510, to allow passengers on the transportation vehicle to be exposed to (e.g., view or listen to) uploaded data such as, for example, television shows, newspapers, books, movies, audio programs, e.g., music, radio, etc. (see, for example, uploaded data 520 illustrated in FIG. 5), at their discretion. This data may be provided in one or more memory devices on the transportation vehicle. For example, an aircraft may include one or more memory units that are configured to store a plurality, e.g., 300, movies, for passengers of the aircraft to watch at their discretion, for example, for a fee.

The audio-video data stored on the transportation vehicle may be updated over time to provide new and/or more timely data for review by the passengers. This updating may be performed by transmitting data from an audio-video data source to the transportation vehicle when the vehicle is not in use. However, such a data link may not be possible, for example, when an aircraft is too close to an airport, it is possible that the communication signal with the base station(s) may be weakened, reduced or lost. Therefore, this updating may alternatively be performed by a technician accessing the memory units to provide new audio-video data in the transportation vehicle data, e.g., by using a notebook computer, Personal Data Assistant (PDA). This technician could also access memory 1270 on the transportation vehicle that store monitoring (previously transmitted to the base station(s)) and feedback data (previously received from the base station(s)), as discussed elsewhere in this specification.

By periodically accessing the previous monitoring and feedback data, the system may be provided with another mechanism to ensure that all data is being communicated to and from the transportation vehicle, which may or may not be an issue. For example, it is possible that crew of either a transportation vehicle or a base station may not appreciate that a communication link has been lost during transmission of data. Although the monitoring and feedback systems designed in accordance with at least one embodiment of the invention may include mechanisms for determining when a link has been lost and re-establishing the communication link, the ability to access on-board memory including, for example, the previous week's monitoring and feedback data, would allow an archive of data stored, for example, at the base station(s) or a centralized archive, to include the most complete data possible. Such a centralized archive of data may be implemented at one or more secure facilities, e.g., for the purpose of disaster recovery and redundancy of service data. By storing identical data at more than one location, the likelihood of losing access to that data at any given point of time is decreased.

Alternatively, or in addition, the on-transportation vehicle audio-video data memory may be supplemented with the ability to view other audio-video data, e.g., obscure movies, listed in an on-board index, and uploadable via an uplink signal from, for example, the base station(s) and/or one or more supplemental audio-video data support station(s). This uplink signal may be the same uplink signal that is used to provide feedback information from the base station(s) to the transportation vehicle. In such an implementation, the data to be uploaded for video-on-demand may be compressed and, optionally, interleaved with the feedback data provided from the base station(s).

In accordance with at least one embodiment of the invention, the hardware located on a plurality of transportation vehicles is identical, for example, the equipment used on all aircraft's is identical, all aircraft owned by a particular carrier is identical or on a particular model of aircraft is identical. In this way, faulty equipment may be swapped for fully functional equipment with ease because of standardization. Moreover, particular services, such as continuous monitoring of flight path and in-flight parameters, requested by the operator, for example, a pilot or airline carrier, associated with a particular transportation vehicle may be easily and efficiently loaded into the standard hardware. Thus, standard hardware may be used by technicians to configure custom systems and service packages for particular transportation vehicles in an effective manner. During such a configuration, hardware (having a unique identification data) and an associated service package for the transportation vehicle are associated with the vehicle in the monitoring and feedback data system archives, e.g., the hardware and service package are associated with a "tail number" of an aircraft, a vehicle identification number on an automobile, etc.

Subsequent to configuration, operators of the transportation vehicles (pilots, carriers, dispatchers, etc.) can monitor which transportation vehicles they choose and which parameters associated with those transportation vehicles they choose.

It should be understood that, with reference to any of the embodiments of the invention, transportation vehicle operators may use the monitored data for their own use. Thus, it is possible that the invention may be used to monitor operation of transportation vehicles and provide a platform that allows a carrier to provide feedback to crew of the transportation vehicle. Therefore, it should be understood that, the carrier may utilize its own personnel to provide feedback services to the transportation vehicle based on monitored parameters of the transportation vehicles' operation. This monitoring information may be provided, for example, using landlines, following receipt of the monitoring information by one or more base station(s). Further, the carrier (an organization with a plurality of transportation vehicles in a fleet, e.g., an air line, a trucking company, a shipping company etc.) may check on specific transportation vehicles, vehicle models, operators, etc. For example, the carrier may check on specific aircraft, aircraft models, operators, e.g., pilots, crew, geographic regions (e.g., in case of localized weather), etc. It should be understood that, if data is being communicated to carriers, that the each carrier may have a carrier-specific encryption scheme that allows only them, or them and the system operators, access to that data. Alternatively, encryption schemes may be specific to individual operators, e.g., private pilots.

In accordance with at least one embodiment of the invention, different transmission frequencies may be used for different types of transportation vehicles, for example, aircraft may transmit data in a different frequency range than both shipping vehicles and automotive vehicles. In this way, data transmitted from these vehicles may differentiated from each other and routed to the appropriate system components and/or industry-specific base station(s). Alternatively, or in addition, information indicating the type of transportation vehicle may be included in headers associated with packet information transmitted to and from the transportation vehicle(s). Further, private encryption keys may be associated with particular operators, carriers, vehicle types or industries to ensure that data associated with, for example, a commercial freight trucking organization's fleet is not confused with data associated with or accessed by a commercial, international airline. It should be appreciated that these private keys may be static or dynamically changed on a periodic, e.g., monthly, quarterly, or yearly, basis.

At least one embodiment of the invention may be utilized in conjunction with simulator training of transportation vehicle personnel. For example, by recording and archiving the parameters associated with transportation vehicle accidents, the data may be used to simulate potentially detrimental situations in a simulator environment for personnel training. For example, if monitored and archived data associated with a previous aircraft accident indicated that an aircraft suffered from the adverse consequences of certain events, e.g., high cross winds, a failed engine and poor visibility, the circumstances may be identically reproduced in a simulator setting for training of personnel.

Further, if data transmitted from a transportation vehicle indicates that the vehicle crew are unable to perform their duties, e.g., due to illness, accident or equipment malfunction, the data received from the vehicle in real-time or near-real-time may be used to override the controls of the vehicle. Subsequently, the vehicle may be operated remotely using a simulator. In such a situation, video data from a camera on board the vehicle may be used to steer the vehicle, e.g., for a landing (e.g., aircraft), docking (e.g., shipping or other vessel), or stopping (e.g., train, automobile, truck, etc.). Such a remote operation capability may be beneficial, for example, if an airline cockpit is filled with smoke so that the crew cannot read gauges or monitors to operate a plane, a train engineer becomes incapacitated due to illness, a truck driver falls asleep at the wheel, etc. It is possible that the transportation vehicles may be operated remotely or oral instructions or an alert may be generated to assist the transportation vehicle crew in safe operation.

It should be understood that the data monitored on the transportation vehicle may be digital data and/or analog data. Thus, the monitoring and feedback system may be implemented with transportation vehicles that utilize analog data meters, e.g., older air craft which may not include an FDR, automotive transportation (e.g., cars, trucks, tractor trailers, etc.), trains, ships, etc.

The data transmitted from the transportation vehicle(s) may be stored in a database and processed or analyzed using visual basic application for monitoring and analysis. Alternatively, the data may be analyzed and stored in any manner; however, it may be preferable to store and analyze the data using a widely accepted or standard data format.

In accordance with at least one embodiment of the invention, the monitoring and feedback system may utilize GPS technology to accurately identify a position of a transportation vehicle(s) continuously, periodically and/or upon an explicit request to do so. Further, in at least one implementation, at least one of the on-vehicle component and the base station component receives information about a position of the transportation vehicle. See, for example, the vehicle positioning information receiver 540 illustrated in FIG. 5.

In accordance with at least one embodiment of the invention, the monitoring and feedback system may utilize GPS or other location tracking data to determine speed of the transportation vehicle. Such a capability may be beneficial to self-regulate transportation vehicle operators and crew to ensure that they are not exceeding a maximum legal limit. Alternatively, such an indication of speed may be used to determine whether a transportation vehicle is experiencing traffic congestion, e.g., a traffic jam on a highway experienced by a truck driver, experiencing inclement weather conditions, e.g., a localized hail storm, or is suffering from equipment problems.

In accordance with at least one embodiment of the invention, the monitoring and feedback system may be configured to compare location data associated with one or more transportation vehicles with maps, e.g., road maps, to determine a travel route of one or more transportation vehicles.

Thus, following a determination that a particular transportation vehicle is operating at a speed that is slower than expected (based on, for example, an indicated GPS position and a previously known speed limit at that position), the monitoring and feedback system may react by performing various actions. This determination may take into account the fact that a transportation vehicle may be stopped at an intersection or stopped completely; therefore, the average speed of a vehicle may be compared with a range of speeds, e.g., X<Speed<Y, where Y may be approximately an expected speed minus an expected deviation and X may be a minimum possible speed, for example, five miles an hour).

The monitoring and feedback system may then determine if other monitored transportation vehicles are traveling near (based on some predetermined distance metric) the slowly moving transportation vehicle. Subsequently, the system may determine whether transportation vehicles traveling along the same route as the slowly moving vehicle are also traveling slowly. If so, the monitoring and feedback system may, for example, query the transportation vehicle operator(s) moving slowly to determine why they are moving slowly. This reason may be due to, for example, a traffic jam or localized inclement weather. Following a determination of why the vehicles are moving slowly, the monitoring and feedback system may convey alert information to other transportation vehicles which may soon experience the cause of the delay, i.e., they are moving toward the area where vehicles are moving slowly. This alert may be provided automatically as a broadcast only to identified, monitored, transportation vehicles. This alert may be supplemented with information on alternative travel routes that may avoid delays.

Alternatively, following a determination that more than one transportation vehicle is moving slowly within a geographic area, a weather service may be referred to determine whether that area is experiencing inclement weather. Therefore, it may not be necessary to contact the slowly moving transportation vehicles to determine the reason for the decreased speed. That is, a determination may be made that the slow rate of speed is due to traffic congestion if there is not inclement weather reported by the weather service.

Further, following a determination that more than one transportation vehicle is moving slowly within a geographic area, a service reporting status of pending road work may be referred to determine whether that area is undergoing construction. Therefore, it may not be necessary to contact the slowly moving transportation vehicles to determine the reason for the decreased speed. That is, a determination may be made that the slow rate of speed is due to traffic congestion based on the information from the status reporting service.

Additionally, the monitoring and feedback system may refer to both a weather service and a road construction status service prior to contacting the slowly moving transportation vehicles' operators or to alerting other transportation vehicles.

If it is determined that a particular transportation vehicle is operating below an expected speed, but no other proximate transportation vehicles are experiencing similar decreased speeds, the monitoring and feedback system may automatically, semi-automatically or at the request of a system operator, access maintenance records to determine whether the transportation vehicle has a history of operation problems. Alternatively, or in addition the system may automatically, semi-automatically, or at the discretion of a system operator, contact the vehicle operator to offer assistance based on the detected and isolated slow rate of travel and/or based on a known history of operation problems.

At least one embodiment of the invention may be used to enforce mandatory rest requirements for operators of transportation vehicles. For example, a government or a particular carrier may have mandatory prescribed rest periods to ensure that their vehicle operators are not mentally or physically fatigued. The monitoring and feedback system may monitor an amount of time that a transportation vehicle is operated within a specific period and alert the operator and/or carrier when prescribed rest is required. Moreover, archived data indicating whether or not a carrier's operators are following prescribed rest-requirements may be used to improve insurance premiums paid by the carrier on its vehicles, show regulatory compliance etc. It is foreseeable that a transportation vehicle may include a profile of operator(s) associated with the transportation vehicle. Therefore, in the case of a tractor trailer operated by a pair of individuals, the on-board component may be configured to recognize which operator is operating the transportation vehicle. Alternatively, the on and/or off-board components may simply recognize that prescribed rest period monitoring may not be effectively performed for transportation vehicles operated by more than one operator on a given vehicle trip.

In accordance with at least one embodiment of the invention, the system base station(s) may detect when a transportation vehicle's on-board component is not operating effectively. For example, the base station(s) may detect when an on-board component has been tampered with, e.g., because the base station(s)' receipt of a signal that is continuously or periodically transmitted from the on-board component is interrupted. Such a signal may include a data signature that is proprietary to the system or is specific to the particular on-board component.

Additionally, in accordance with at least one embodiment of the invention, if an on-board component is malfunctioning in some way, a data signature may indicate the malfunctioning to the base station(s). Thus, the on-board component may include self diagnostic hardware and/or software that allows the on-board component to recognize when, for example, specific sensors are not operational or malfunctioning, whether other parts of the on-board component are malfunctioning, or the on-board component has been tampered with. This self-diagnostic information may then be transmitted to the base station(s).

One or more operational parameters of a monitored transportation vehicle may be monitored at various rates, for example, one or more operation parameters may be monitored ten times a second, once a second, ten times a minute, once every ten minutes, etc., and stored in a memory buffer (e.g., a First In First Out buffer). Each of the monitored operation parameters may be transmitted at the same or a lower rate to the base station(s). For example, the monitored data may be pre-processed on board the transportation vehicle, as explained elsewhere in this specification. The monitored operation parameters may also be stored on board the transportation vehicle for the duration of a vehicle's immediate operation, for example, an aircraft's flight, a train's operation until it reaches its destination, etc. At that time, the data may be transmitted to a long term memory on the transportation vehicle until such time that a technician accesses and download that data, as explained elsewhere in this specification.

In accordance with at least one embodiment of the invention, the monitoring and feedback system may be used to detect theft of a transportation vehicle and recover the transportation vehicle. For example, the location of the transportation vehicle may be monitored based on, for example, GPS technology or other technology allowing tracking of the transportation vehicle. Following some indication that the transportation vehicle has been stolen, e.g., a telephone call from the operator of the transportation vehicle, the monitoring and feedback system may be used to locate that transportation vehicle for reacquisition. Alternatively, or in addition, the monitoring and feedback system may be configured to provide some degree of remote control of the transportation vehicle so that vehicle may be rendered non-operational. Such a configuration may involve including a remote activated "kill switch".

In accordance with at least one embodiment of the invention, the auxiliary sensors 1260 may include sensors configured to determine quantity and location of cargo including, luggage and passengers. For example, in passenger transportation vehicles, sensors may be included in seats that indicate the presence of a passenger. Additionally, for passenger ships, sensors may be included in cabins or bunks to indicate the presence of passenger(s). Such information may be beneficial for accident recovery, for example, to indicate how many passengers were on an aircraft, in a train car, etc. These sensors may determine whether a passenger is sitting in the seat at a time when all passengers must be seated, for example, at take off of an aircraft. Alternatively, or in addition, the sensors may determine whether a passenger is sitting in the seat when, for example, a train leaves a train station, or periodically during operation of the transportation vehicle. This information may be useful in determining relative capacity of a transportation vehicle during operation over a given route.

Additionally, sensors may be included in cargo bays that indicate the presence, quantity (size and/or weight), and location of cargo.

In accordance with at least one embodiment of the invention, the transportation vehicle may include passenger interfaces, e.g., located at each seat on a transportation vehicle, that allow a passenger to initialize, and/or, maintain, update and/or utilize a personalized passenger profile.

Such a profile may include, for example, identification data associated with the passenger, e.g., name, address, frequent flyer number, frequent traveler number, company affiliation, language spoken, dietary preferences or restrictions, health issues (e.g., diabetes, epilepsy, etc.), medications, allergies, data associated with an account that the traveler has with the transportation vehicle carrier, movie choices, electronic-mail account information, information indicating previous trips on transportation vehicles, musical tastes, preferred ambient temperature, etc. Based on this information, a user may access on-board electronic mail capability to, for example, check their electronic mail accounts, view movies or read books available in a repository of data stored on board the transportation vehicle or available via a link with off-board repositories (as explained elsewhere in this application), check stock market information, etc. It should be appreciated that data communicated by a passenger via the on-board component's communication link(s) may be encrypted in any number of ways and at the discretion of the passenger to protect the passenger(s)' privacy.

Additionally, some or all of the crew may have limited access to information included in the passenger(s) profile to provide improved service to the passenger(s) by, for example, speaking to the passenger in their native language without having to determine what language that may be, recognizing health concerns earlier based on information that a passenger may not be able to convey (e.g., when a passenger has slipped into a diabetic coma), etc.

A passenger and their passenger profile may be associated with a particular seat, cabin, compartment or bunk on the transportation vehicle by assignment of, for example, a ticketing agent that assigns the seats and provides this information to the monitoring and feedback system. Alternatively, passengers may have personalized identification data and passwords that they may key into a console at or near their seat.

Further, the passengers may have identification cards or keys, for example, smart cards, that may be inserted, scanned or otherwise read by a reader that reads the identification data off the card and accesses associated information stored in a repository, either on or off board, or reads the passenger's profile data off the card as well.

Moreover, the cards or keys may be both readable and writable in that the reader included at the system may also have the capability to write data to the card or key, if the passenger profile data is stored on the card or key.

In accordance with at least one embodiment of the invention, one or more sensors and components may have unique IP addresses associate with each of them. Such an implementation may allow system operations and processes to uniquely identify the sensors and components to better enable communication, interaction and cooperation. For example, each seat may have an IP address associated with it and any associated passenger presence sensor, passenger interface, etc. Similarly, for passenger ships, e.g., cruise ships, an IP address may be associated with each passenger cabin, bunk, etc.

In accordance with at least one embodiment of the invention, passengers may be optionally exposed (e.g., at their discretion) to stored or broadcast audio-video programming. The broadcast audio-video programming may be interleaved with other data on communication link(s) to the transportation vehicle. In at least one implementation of this embodiment, a carrier operating one or more transportation vehicles may be able to optionally expose passengers to customized programming provided, for example, daily, twice daily, etc., by the monitoring and feedback system's on-board component receiving that programming via the communication link(s) with the transportation vehicle. In accordance with at least one embodiment of the invention the on-board component of the transportation vehicle may be configured to interface with mobile phones, computers, personal data assistants and other personal computing and telecommunication equipment to allow passengers to utilize data communication links provided in the on-board component of the system.

Figure 6:
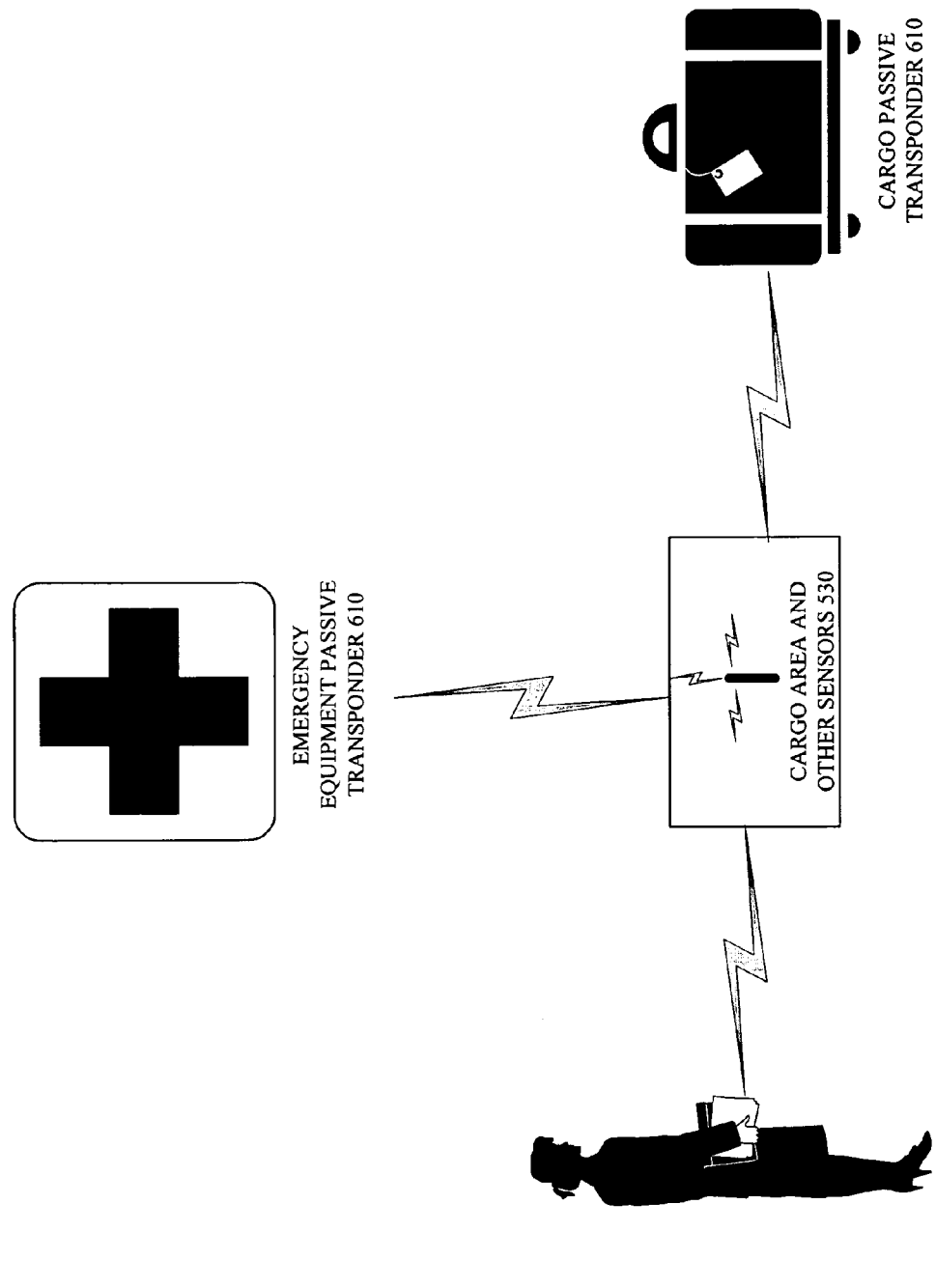
FIG. 6 illustrates additional details of one implementation of the on-vehicle component provided on a transportation vehicle in accordance with the embodiments of the invention.

In accordance with at least one embodiment of the invention, passengers may be provided with passive transponders (see, for example, passenger passive transponder 620 illustrated in FIG. 6), e.g., in decorative pins or on bracelets, that include identification data about the passenger. These passive transponders may be configured to interact with sensors located on board the transportation vehicle, e.g., located in door frames, (see, for example, sensors 530 illustrated in FIGS. 5 and 6) as part of the monitoring and feedback system. Interaction of these transponders and the sensors may be used to determine a location of a passenger on the transportation vehicle, e.g., parents are looking for a child on a large cruise ship.

In accordance with at least one embodiment of the invention, safety equipment provided on board transportation vehicle(s) may be equipped with passive transponders (see, for example, emergency equipment passive transponder 610 illustrated in FIG. 6). The monitoring and feedback system's on-board component may be configured to identify the identity of those transponders (see, for example, sensors 530 illustrated in FIGS. 5 and 6) and keep a count of how many transponders have been identified during a particular period. For example, in the event that a transportation vehicle emergency occurs, life vests may be distributed to passengers and crew prior to evacuating the transportation vehicle. Access of a receptacle including the life vests may trigger operation of the on-board component such that, a determination is made whether the life vest is being worn by a passenger (for example, by detecting whether a clip securing the life vest on the passenger has been operated) and how many life vests are being worn by passengers. This information may be communicated to the base station(s) to assist rescue operations. Such information may be useful in determining how many passengers were evacuated and need to be recovered. Moreover, depending on the strength of the transponders, they may be used to help locate the evacuated passengers.

In accordance with at least one embodiment of the invention, the on-board component of the system may be configured to recognize cargo (using, for example, cargo area and other sensors 530 illustrated in FIGS. 5 and 6) being loaded onto and off the vehicle and stored on the vehicle by recognizing transponders attached to the cargo (see, for example, cargo passive transponder 630 illustrated in FIG. 6). For example, the cargo may be luggage, plats of products, etc. The transponders may include unique identification data and be associated with specific cargo in a database accessible by or included in the on-vehicle component of the system. This information may be used to control or assist in loading and off-loading of cargo and/or checking again transportation vehicle manifests. This additional information may be beneficial by reducing or minimizing the amount of time necessary to ensure that all cargo has been loaded or off-loaded at a port, destination, or prior to arrival.

In accordance with at least one embodiment of the invention, the on-board component of the system may be configured to include one or more interfaces that provide the capability to connect medical equipment within the transportation vehicle, e.g., an aircraft or cruise ship, to the on-board component, which may be configured to send and receive information to and from doctors, medical personnel, etc., off-board the transportation vehicle. Such interfaces and transmission capability may allow real-time or near real time transmission of medical data relating to a sick or injured person on the transportation vehicle. This transmission and subsequent remote medical diagnosis or advice may allow the transportation vehicle crew to manage and/or resolve a medical situation.

While this invention has been described in conjunction with the specific embodiments outlined above, it is evident that many alternatives, modifications and variations will be apparent to those skilled in the art. Accordingly, the embodiments of the invention, as set forth above, are intended to be illustrative, not limiting. Various changes may be made without departing from the spirit and scope of the invention.

For example, although the explanation of the embodiments of the invention refer often to a transportation vehicle that is an aircraft, train, truck, ship, etc., it is foreseeable that the embodiments of the invention may be used in conjunction with any type of transportation vehicle including but not limited to any vehicle used for transportation of cargo and/or people. Therefore, transportation vehicles may include cars, trucks, boats, ships, aircraft, satellites, or any other now known or later developed vehicle for transportation that includes equipment that is susceptible to failure.

What is claimed is:

1. A method for monitoring operation of at least one transportation vehicle and generating information based on the monitored operation, the method comprising:
    monitoring data associated with at least one operation criterion of the transportation vehicle during operation of the transportation vehicle on the transportation vehicle;
    comparing the monitored data with at least one operation parameter;
    storing the monitored data and results of the comparison of the monitored data with the at least one operation parameter in a first memory on the transportation vehicle;
    transmitting the monitored data from the transportation vehicle to a base-station;
    comparing the transmitted data with at least one operation parameter;
    storing the transmitted data in a second memory at the base-station;
    transmitting feedback data to the at least one transportation vehicle based on the comparison between the transmitted data and the at least one operation parameter; and
    formulating archived scenario data from the data stored in the second memory at the base station that is configured to be used for vehicle operation.

2. The method of claim 1, further comprising storing the feedback data in the second memory at the base-station.

3. The method of claim 1, further comprising performing compression of the monitored data prior to transmitting the data from the transportation vehicle to a base-station.

4. The method of claim 3, further comprising performing decompression of the transmitted data at the base-station.

5. The method of claim 1, further comprising performing data reduction of the monitored data prior to transmitting the monitored data from the transportation vehicle to a base-station.

6. The method of claim 1, further comprising performing encryption of the monitored data prior to transmitting the monitored data from the transportation vehicle to a base-station.

7. The method of claim 6, further comprising performing decryption of the transmitted data at the base-station.

8. The method of claim 1, wherein the transportation vehicle is selected from one of the list consisting of:
an aircraft;
a bus;
a truck;
a car;
a boat;
a ship;
a submarine;
a hovercraft;
a satellite;
a rocket;
a missile;
a blimp;
a balloon;
a utility vehicle;
a train; and
a tank.

9. The method of claim 1, wherein monitoring data uses a data bus installed in the transportation vehicle.

10. The method of claim 1, wherein the monitored data is transmitted from the transportation vehicle to the base-station using the Airborne Call and Recording System and the feedback data is transmitted from the base-station to the transportation vehicle using the Airborne Call and Recording System.

11. The method of claim 1, wherein the monitored data is transmitted from the transportation vehicle to the base-station using the Internet and the feedback data is transmitted from the base-station to the transportation vehicle using the Internet.

12. The method of claim 1, further comprising performing analysis of the transmitted data stored in a second memory at the base-station.

13. The method of claim 12, wherein the analysis compares the transmitted data with other corresponding data for at least one other transportation vehicle.

14. The method of claim 12, wherein the analysis compares the transmitted data with other corresponding data for a plurality of other transportation vehicles.

15. The method of claim 12, wherein the analysis compares the transmitted data with a range of acceptable values for corresponding data.

16. The method of claim 1, wherein the archived scenario data is used to provide at least one suggestion for operation of at least one transportation vehicle.

17. The method of claim 1, wherein the archived scenario data is configured to be used to provide at least one suggestion for subsequent operation of the at least one transportation vehicle.

18. The method of claim 1, wherein the archived scenario data is configured to be used to provide at least one suggestion for subsequent operation of transportation vehicles of a same type as the at least one transportation vehicle.

19. The method of claim 1, wherein the archived scenario data is configured to be used to provide at least one suggestion for subsequent operation of transportation vehicles.

20. The method of claim 1, wherein the archived scenario data is configured to be used to control subsequent operation of the at least one transportation vehicle.

21. The method of claim 1, wherein the archived scenario data is configured to be used to control subsequent operation of transportation vehicles of a same type as the at least one transportation vehicle.

22. The method of claim 1, wherein the archived scenario data is configured to be used to control subsequent operation of transportation vehicles.

23. A system for monitoring operation of at least one transportation vehicle and generating information based on the monitored operation, the system comprising:
an on-vehicle component that is located on a transportation vehicle; and
a base-station component that is located at a base-station for monitoring the transportation vehicle,
wherein, the on-vehicle component monitors data associated with at least one operation criterion of the transportation vehicle during operation of the transportation vehicle, compares the monitored data with at least one operation parameter, stores the monitored data and results of the comparison of the monitored data with the at least one operation parameter in a first memory, and transmits the monitored data to the base-station component, and wherein, the base-station component compares the transmitted data with at least one operation parameter, stores the transmitted data in a second memory at the base-station, transmits feedback data to the at least one transportation vehicle based on the comparison between the transmitted data with the at least one operation parameter, and formulates archived scenario data from the data stored in the second memory that is configured to be used for vehicle operation.

24. The system of claim 23, wherein the on-vehicle component comprises:
a first operational memory coupled to an on-vehicle component bus, the first operational memory being configured to store instructions for operation of the on-vehicle component;
a first controller coupled to the on-vehicle component bus, the first controller being configured to control operation of the on-vehicle component;
a first processor coupled to the on-vehicle component bus, the first controller being configured to control the first processor to fetch instructions from the first operational memory to control operation of the on-vehicle component via the on-vehicle component bus;
a first archival memory coupled to the on-vehicle component bus, the first archival memory being configured to store the monitored data; and
a first transceiver unit coupled to the on-vehicle component bus, the first transceiver unit being configured to transmit the monitored data.

25. The system of claim 24, wherein the first operational memory is a flash memory.

26. The system of claim 24, further comprising a transportation vehicle data bus interface coupled to the on-vehicle component bus and to a transportation vehicle data bus, the transportation vehicle data bus interface being configured to receive transportation vehicle operation data from the transportation vehicle data bus.

27. The system of claim 26, wherein the transportation vehicle data bus interface is configured to provide an interface with a transportation vehicle data recorder and to transportation vehicle sensors that provide information about the operation of the transportation vehicle.

28. The system of claim 27, wherein the on-vehicle component further comprises at least one auxiliary sensor that acquires information about the transportation vehicle that is supplementary to the data provided by the transportation vehicle data bus interface.

29. The system of claim 27, wherein the on-vehicle component further comprises at least one auxiliary sensor associated with at least one part of the transportation vehicle.

30. The system of claim 29, wherein the transportation vehicle is a train and the at least one auxiliary sensor is associated with a train engine.

31. The system of claim 29, wherein the transportation vehicle is a train and the on-vehicle component is incorporated in a train engine.

32. The system of claim 29, wherein the transportation vehicle is a tractor trailer and the at least one auxiliary sensor is associated with a tractor or a trailer.

33. The system of claim 29, wherein the transportation vehicle is a tractor trailer and the on-vehicle component is incorporated in a tractor.

34. The system of claim 27, wherein the on-vehicle component further comprises at least one auxiliary sensor that is configured to monitor for and detect pathogens on the transportation vehicle.

35. The system of claim 27, wherein the on-vehicle component further comprises at least one auxiliary sensor configured to monitor for and detect spoilage of perishable cargo on the transportation vehicle.

36. The system of claim 23, wherein a transportation vehicle profile is associated with all monitored and archived data associated with a corresponding transportation vehicle provided by the system.

37. The system of claim 23, wherein at least one of the on-vehicle and base station components receive sensory information from sensors located off the transportation vehicle.

38. The system of claim 37, wherein the transportation vehicle is a train and the sensors located off the transportation vehicle indicate track condition of train tracks that indicate at least one of track conditions, track obstructions, and track integrity.

39. The system of claim 23, wherein transmission of data between the on-vehicle component and the base-station component is packet-based.

40. The system of claim 23, wherein transmission of data between the on-vehicle component and the base station component is encrypted.

41. The system of claim 23, wherein transmission of data between the on-vehicle component and the base station component utilizes Secure Sockets Layer protocol.

42. The system of claim 23, wherein data received from sensors on the transportation vehicle is retransmitted a plurality of times from the on-vehicle component to the base-station component and the base station component selects data to be processed and analyzed from the plurality of data received.

43. The system of claim 23, wherein the base-station component is configured to access weather data relating to the transportation vehicle.

44. The system of claim 23, wherein the base-station component is configured to access traffic data relating to a geographic location of the transportation vehicle.

45. The system of claim 23, wherein the on-vehicle component of the monitoring and feedback system is compatable with the Bluetooth industry specification.

46. The system of claim 23, wherein the on-vehicle component is configured to allow a technician to transfer data from the on-vehicle component to a hand held device using a Bluetooth or other wireless transfer protocol or technology.

47. The system of claim 46, wherein the hand held device includes analysis software that analyzes data transferred from the on-vehicle component.

48. The system of claim 23, wherein the on-vehicle component includes a network configured to enable cooperation, communication and interaction of sub-components of the on-vehicle component.

49. The system of claim 48, wherein the network enables passengers on the transportation vehicle to at least one of send or receive electronic mail, print out electronic mail, send or receive faxes, browse public or private networks, via a personal data assistant, personal computer, phone, pager, or user interface built into the transportation vehicle.

50. The system of claim 23, wherein the on-vehicle component includes hardware and software configured to provide video-on-demand capability.

51. The system of claim 23, wherein the on-vehicle component optionally exposes at least one passenger to uploaded data.

52. The system of claim 51, wherein the uploaded data includes at least one of a television show, newspaper, book, movie, and audio program, at the passenger's discretion.

53. The system of claim 51, wherein the uploaded data is transmitted to the on-vehicle component from the base-station component.

54. The system of claim 51, wherein the on-vehicle component optionally exposes at least one passenger to data including at least one of a television show, newspaper, book, movie and audio program stored in one or more memory devices coupled to the on-vehicle component.

55. The system of claim 23, wherein at least one of the on-vehicle component and the base station component receives information about a position of the transportation vehicle.

56. The system of claim 55, wherein the information about the position of the transportation vehicle is provided using a Global Positioning System.

57. The system of claim 23, wherein the on-vehicle component includes sensors that monitor for and detect passive transponders on the transportation vehicle.

58. The system of claim 57, wherein the passive transponders are associated with cargo on the transportation vehicle.

59. The system of claim 57, wherein the passive transponders are associated with passengers on the transportation vehicle.

60. The system of claim 57, wherein the passive transponders are associated with emergency equipment on the transportation vehicle.

61. The system of claim 24, wherein the first transceiver unit is configured to enable communication with the base-station component, wherein the first transceiver unit includes or is coupled to at least one antenna assembly configured to provide communication with an off-vehicle component.

62. The system of claim 61, wherein the at least one antenna assembly includes a blade antenna.

63. The system of claim 62, wherein the at least one antenna assembly is configured to track satellites dynamically to provide communication with the at least one base station component.

64. The system of claim 61, wherein the at least one antenna assembly includes an attitude controller.

65. The system of claim 61, wherein the at least one antenna assembly includes at least one patch antenna.

66. The system of claim 24, wherein the first transceiver unit includes or is coupled to a plurality of antenna assemblies located on a tail section of the transportation vehicle.

67. The system of claim 66, wherein the transceiver unit utilizes one of the plurality of antenna assemblies based on a determination of which antenna assembly provides a best communication link quality based on analysis performed using an algorithm.

68. The system of claim 24, wherein the base-station component comprises:
- a second transceiver coupled to a base-station bus and configured to receive data corresponding to the at least one transportation vehicle criterion from the first transceiver of the base-station component;
- a second controller coupled to the base-station bus, the second controller being configured to control operation of the base-station component;
- a second operational memory coupled to the base-station bus, the second operational memory being configured to store instructions for operation of the base-station component;
- a second processor coupled to the base-station bus, the second controller being configured to control the second processor to fetch instructions from the second operational memory to control operation of the base-station component via the base-station component bus;
- a second archival memory coupled to the base-station bus, the second archival memory being configured to store the transmitted data; and
- a network interface coupled to the base-station bus, the network interface being configured to provide access to information used by the processor to formulate the at least one operation parameter.

69. The system of claim 23, wherein the transportation vehicle is selected from one of the list consisting of:
- an aircraft;
- a bus;
- a truck;
- a car;
- a boat;
- a ship;
- a submarine;
- a hovercraft;
- a satellite;
- a rocket;
- a missile;
- a blimp;
- a balloon;
- a utility vehicle;
- a train; and
- a tank.

70. The system of claim 23, wherein the archived scenario data is used to provide at least one suggestion for operation of at least one transportation vehicle.

71. The system of claim 23, wherein the archived scenario data is configured to be used to provide at least one suggestion for subsequent operation of the at least one transportation vehicle.

72. The system of claim 23, wherein the archived scenario data is configured to be used to provide at least one suggestion for subsequent operation of transportation vehicles of a same type as the at least one transportation vehicle.

73. The system of claim 23, wherein the archived scenario data is configured to be used to provide at least one suggestion for subsequent operation of transportation vehicles.

74. The system of claim 23, wherein the archived scenario data is configured to be used to control subsequent operation of the at least one transportation vehicle.

75. The system of claim 23, wherein the archived scenario data is configured to be used to control subsequent operation of transportation vehicles of a same type as the at least one transportation vehicle.

76. The system of claim 23, wherein the archived scenario data is configured to be used to control subsequent operation of transportation vehicles.

* * * * *